US012649681B2

(12) United States Patent
Biland

(10) Patent No.: US 12,649,681 B2
(45) Date of Patent: Jun. 9, 2026

(54) HIGH CAPACITY BUSHING PLATE FOR PRODUCING IGNEOUS ROCK FIBERS

(71) Applicant: Rock Fiber, Inc., Houston, TX (US)

(72) Inventor: Oleksandr Biland, The Woodlands, TX (US)

(73) Assignee: Rock Fiber, Inc., Houston, TX (US)

( * ) Notice: Subject to any disclaimer, the term of this patent is extended or adjusted under 35 U.S.C. 154(b) by 197 days.

(21) Appl. No.: 18/415,122

(22) Filed: Jan. 17, 2024

(65) Prior Publication Data

US 2024/0246852 A1 Jul. 25, 2024

Related U.S. Application Data

(60) Provisional application No. 63/480,797, filed on Jan. 20, 2023.

(51) Int. Cl.
*C03B 37/09* (2006.01)
*C03B 37/095* (2006.01)
(52) U.S. Cl.
CPC .......... *C03B 37/091* (2013.01); *C03B 37/095* (2013.01)
(58) Field of Classification Search
None
See application file for complete search history.

(56) References Cited

U.S. PATENT DOCUMENTS

| | | |
|---|---|---|
| 8,806,900 B2 | 8/2014 | Brik |
| 10,696,576 B2 | 6/2020 | Prabhu et al. |

| | | | |
|---|---|---|---|
| 2006/0218972 A1* | 10/2006 | Brik | ...................... C03B 5/265 65/495 |
| 2007/0209399 A1* | 9/2007 | Thompson | .......... C03B 37/0209 65/498 |
| 2016/0176750 A1* | 6/2016 | Richardson, III | ...... C03B 37/08 65/495 |

(Continued)

FOREIGN PATENT DOCUMENTS

| | | |
|---|---|---|
| CN | 201003033 | 1/2008 |
| CN | 113233756 A | 8/2021 |

(Continued)

OTHER PUBLICATIONS

Bui, Huy-Tien et al., "Modeling a working coil coupled with magnetic flux concentrators for barrel induction heating in an injection molding machine", International Journal of Heat and Mass Transfer, Mar. 12, 2015 (Online publication date), vol. 86, pp. 16-30.

(Continued)

*Primary Examiner* — Lisa L Herring
(74) *Attorney, Agent, or Firm* — Neo IP

(57) ABSTRACT

An inductively heated bushing box and fiber formation method for an igneous rock melting furnace. The bushing box includes side walls with a water cooling system surrounded by one or more induction coils for maintaining and even temperature distribution of melted charge before the melt is extruded through tips of a bushing plate. The bushing plate is offset from the bottom of the one or more induction coils to avoid end effects and better ensure consistent eddy current formation. By increasing the uniformity of temperature distribution over a larger surface area, the system allows for a greater number of tips per bushing plate, and therefore provides for greater efficiency.

12 Claims, 21 Drawing Sheets

(56)                References Cited

U.S. PATENT DOCUMENTS

| | | | |
|---|---|---|---|
| 2017/0240450 A1 | 8/2017 | Meng et al. | |
| 2017/0362111 A1* | 12/2017 | Biland | .................... C03B 3/023 |
| 2021/0053856 A1 | 2/2021 | Biland et al. | |
| 2024/0182346 A1* | 6/2024 | Biland | ................. C03B 37/083 |

FOREIGN PATENT DOCUMENTS

| | | | |
|---|---|---|---|
| SU | 461908 A1 | 2/1975 | |
| SU | 1211230 A1 | 2/1986 | |

OTHER PUBLICATIONS

Heidari, Hamed et al., "Influence of magnetic flux concentrator on the induction heating process in crystal growth systems-geometry investigation", CrystEngComm, Nov. 26, 2018 (Publication date), vol. 20, pp. 7857-7865.

Mrozek, Krzysztof et al., "Application of magnetic concentrator for improvement in rapid temperature cycling technology", Polymers, Dec. 28, 2020 (Publication date), vol. 13, Article No. 91, Internal pp. 1-17.

Rudnev, Valery I., "An objective assessment of magnetic flux concentrators", Heat Treating Progress, Nov./Dec. 2004, pp. 19-23.

* cited by examiner

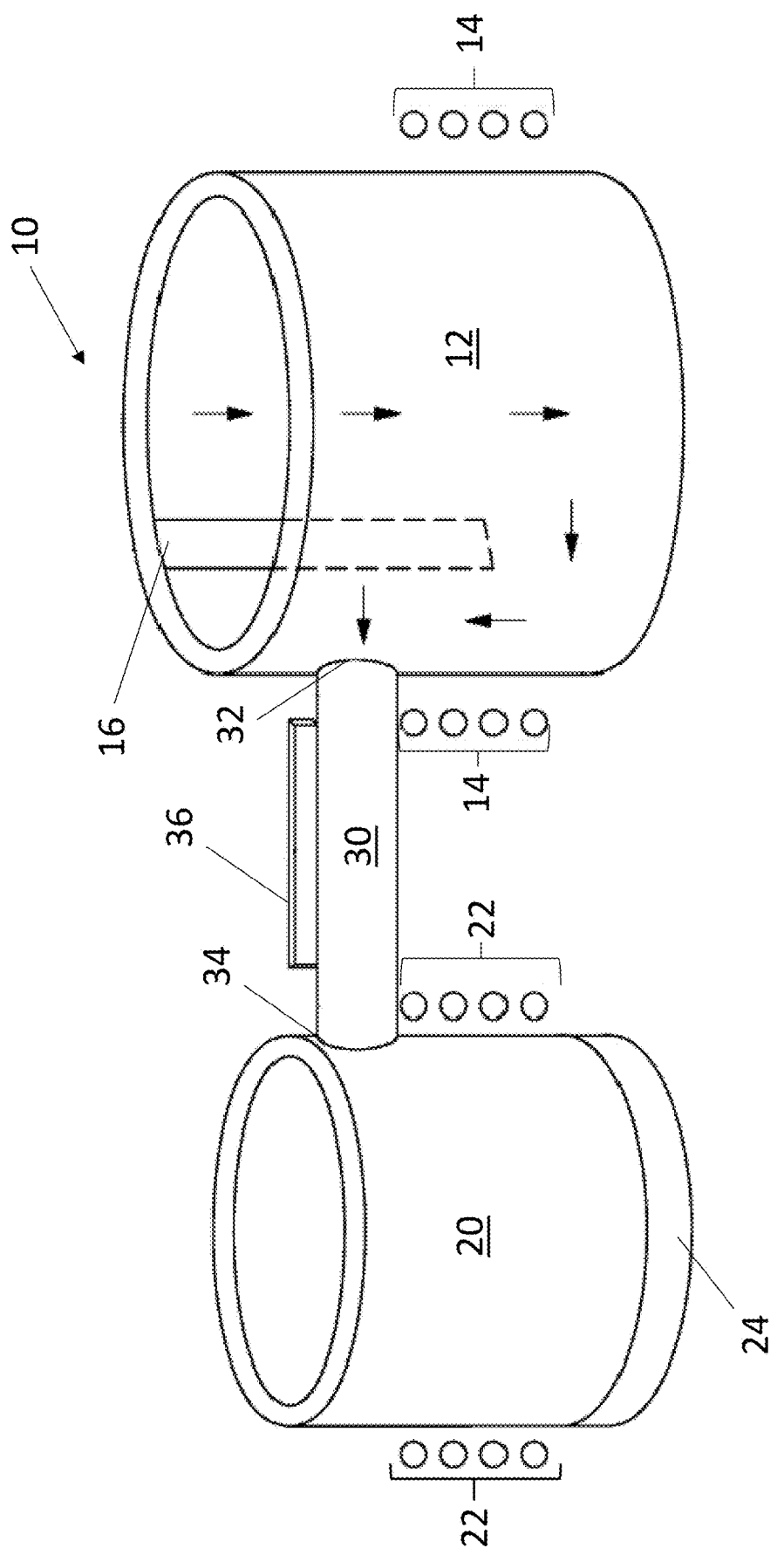
PRIOR ART FIG. 1

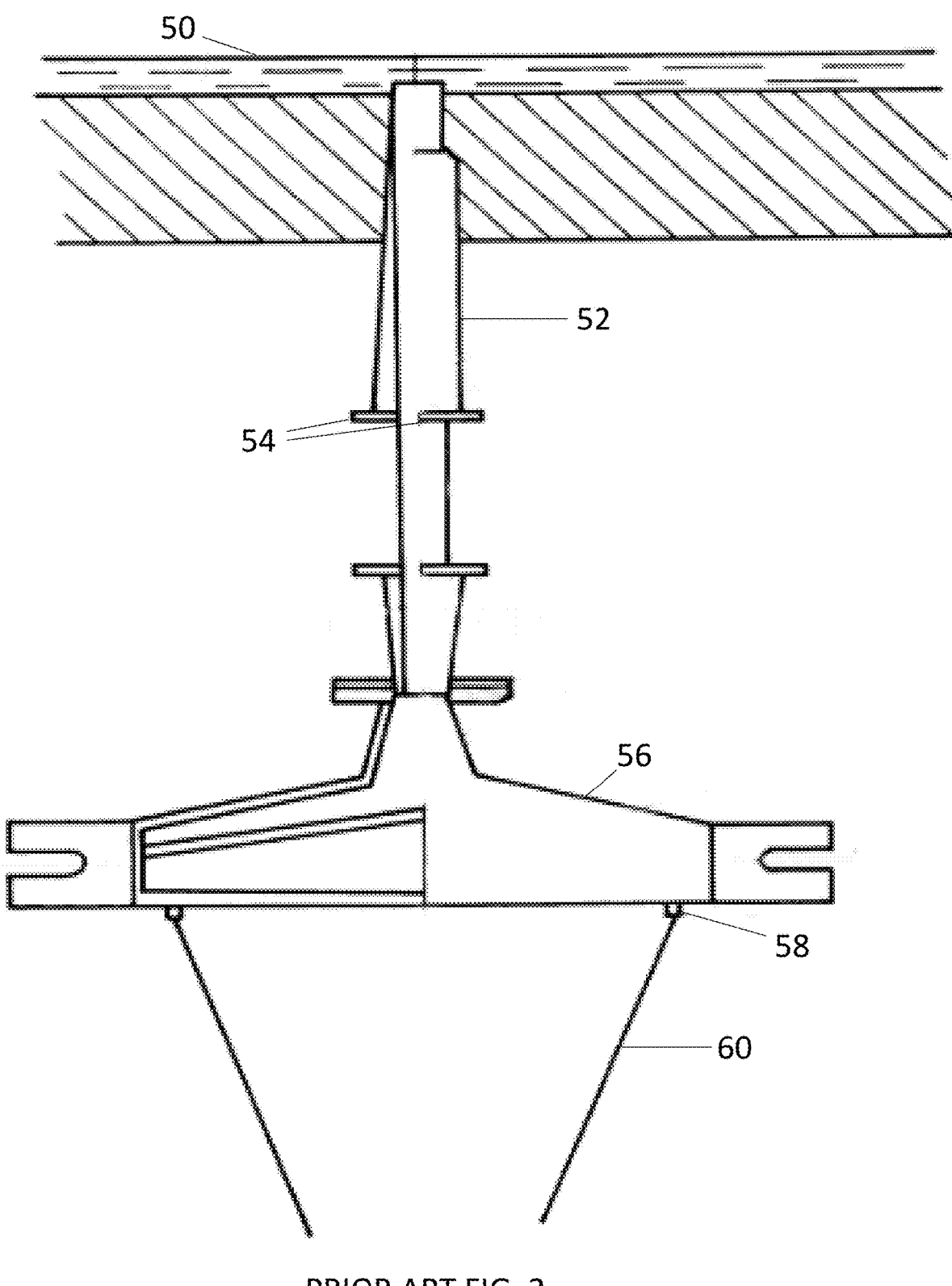
PRIOR ART FIG. 2

100

114 102 112

100

104

102

108

112

114

300

310

312

300

304

310

312

306

302

HIGH CAPACITY BUSHING PLATE FOR PRODUCING IGNEOUS ROCK FIBERS

CROSS REFERENCES TO RELATED APPLICATIONS

This application claims priority to and the benefit of U.S. Provisional Patent Application No. 63/480,797, filed Jan. 20, 2023, which is incorporated herein by reference in its entirety.

BACKGROUND OF THE INVENTION

1. Field of the Invention

The present invention relates to bushing plates for the manufacture of igneous rock fibers, and more specifically to direct, inductive, and other, heating mechanisms for bushing plates for manufacturing igneous rock fibers.

2. Description of the Prior Art

It is generally known in the prior art to provide bushing plates in the manufacture of fibers, including fiberglass and basalt fiber, where the bushing plates include a plurality of holes for extrusion of melted igneous rock for the formation of individual igneous rock fibers.

Prior art patent documents include the following:

U.S. Pat. No. 10,696,576 for Basalt processing via electric induction heating and melting by inventors Prabhu et al., filed Jul. 24, 2016 and issued Jun. 30, 2020, discloses an electric induction system and method for induction heating and melting of basalt charge for the production of molten process basalt that can be used for molten basalt processes that produce basalt articles of manufacture including cast basalt articles and continuous basalt casting processes for producing basalt articles such as fibers and filaments.

U.S. Pat. No. 8,806,900 for Ceramic bushing/s consisting local heating/s integrated in apparatus for manufacturing mineral/basalt fibers by inventor Brik, filed Mar. 30, 2006 and issued Aug. 19, 2014, discloses several versions of ceramic bushing/s consisting of local heating element/s integrated in an apparatus for manufacturing mineral/basalt fibers from natural basalt rocks based on alternatives to the Pt/Pt-Rd bushings approach. The ceramic bushing/s having local heating element/s concept promotes minimization or complete replacement of platinum group metals from the process of continuous basalt fiber manufacturing. More specifically, the invention discloses ceramic bushing/s comprising in combination apparatus are designed for manufacturing continuous mineral (basalt) fibers from 7 to 20 micrometers (μm), and also the coarse fibers from 20 μm to 100 micrometers (μm) in amorphous structural state which exhibit flexible/ductile properties. The minimization or complete replacement of the precious Pt, Rd metals allows reduce the cost of basalt fiber therefore increase its compatibility in reinforced concrete/composite applications including Three Dimension Fiber Reinforced Concrete—3D FRC and many other applications. The currently available Pt-Rd orificed bushings are applied for basalt fiber industry greatly limit both the initial raw materials composition, and the efficiency of continuous basalt fiber production increasing their cost. The ceramic bushing/s consisting local heating elements are integrated in apparatus all together capable provide operations from natural basalt rock melting, homogenous basalt glass body preparation, basalt glass body supply to the bushings positioned beneath the bottom platform of the feeder's forehead.

US Patent Publication No. 2017/0240450 for Induction melter for glass melting and systems and methods for controlling induction-based melters by inventors Meng et al., filed Aug. 21, 2015 and published Aug. 24, 2017, discloses systems and methods for heating and melting glass through the use of induction based heating and methods for forming a fiberglass strand. An exemplary induction melter system for melting glass can include a melting vessel and a heated drain. The melting vessel can include a crucible, a first induction coil positioned around at least a portion of the crucible, and a first electromagnetic current generator coupled to the first induction coil. The heated drain can be coupled to the melting vessel, and the heated drain can include a drain tube, a second induction coil positioned around at least a portion of the drain tube, and a second electromagnetic current generator coupled to the second induction coil.

Chinese Patent Publication No. 201003033 for Basalt fiber drawing bushing plate, filed Nov. 3, 2006 and issued Jan. 9, 2008, discloses a basalt fiber drain bushing which can effectively improve the yield and the production efficiency. The drain blushing takes a grooved container structure. A bottom plate of a grooved cavity is provided with a plurality of nozzles. Each nozzle has an outward stretched segment which passes through the bottom plate. The bottom plate is connected with an electrode. A condenser which is used for forcedly cooling the outward stretched segment of the nozzle is arranged under the bottom plate. The beneficial effect of the utility model is that the quantity of the nozzle can be increased to three hundreds to six hundreds. The temperature of the drain bushing can be effectively adjusted and controlled by adjusting the electric current of the electrode and the outward stretched segment of the nozzle to forcedly cool, thereby the utility model is capable of effectively increasing the yield and the production efficiency of the basalt fiber drain blushing with day output reaching to one hundred fifty kilograms to three hundred kilograms, greatly increasing the service life of the drain blushing and being beneficial for reducing production cost.

Chinese Patent Publication No. 113233756 for Basalt fiber bushing plate and basalt fiber production equipment, filed Jun. 9, 2021 and published Aug. 10, 2021, discloses a basalt fiber bushing plate which comprises a horizontal bottom plate and a framework for supporting the bottom plate, wherein the framework comprises two bottom plates which are arranged in parallel, the two bottom plates are connected through a middle supporting piece, the middle supporting piece is respectively connected with the inner long edges of the two bottom plates, the outer long edges of the two bottom plates are respectively provided with a reinforcing supporting piece, a filter screen is arranged above each bottom plate, and a cooler is arranged below the bottom plates. Replace traditional single bottom plate with two bottom plates of efficient, increase production flow improves work efficiency to promote intensity through middle support piece and prevent to warp, increase life. The invention also discloses basalt fiber production equipment comprising the basalt fiber bushing.

Soviet Patent No. 461908 for Glass Feeder by inventors Yantsev et al., filed May 15, 1967 and issued Feb. 28, 1975, and Soviet Patent No. 1211230 for Jet Feeder by inventors Dzhigiris et al., filed Jan. 30, 1984 and issued Feb. 15, 1986 are also relevant.

SUMMARY OF THE INVENTION

The present invention relates to bushing plates for the manufacture of igneous rock fibers, and more specifically to direct, inductive, and other, heating mechanisms for bushing plates for manufacturing igneous rock fibers.

It is an object of this invention to provide an improved bushing plate having an increased number of pores while maintaining homogeneity of the resultant fibers through improved uniform heat distribution.

In one embodiment, the present invention is directed to a system for producing igneous rock fibers, including a bushing box configured to receive molten igneous rock from distribution channels of a furnace, a plurality of electrode terminals lining exterior left and right side walls of the bushing box, operable to inductively heat or maintain temperature of the molten igneous rock in the bushing box, and a tip plate defining a bottom surface of the bushing box and including a plurality of pores through which the molten igneous rock is extruded, wherein the tip plate extends through a front wall and a rear wall of the bushing box, wherein the tip plate is connected to a first end plate proximate to the front wall, and wherein the tip plate is connected to a second end plate proximate to the rear wall, and wherein the plurality of electrode terminals are actuated with current frequencies between about 50 Hz and about 5000 Hz.

In another embodiment, the present invention is directed to a method for producing igneous rock fibers, including a bushing box receiving molten igneous rock from distribution channels of a furnace, a plurality of electrode terminals, lining exterior left and right side walls of the bushing box, inductively heating or maintaining temperature of the molten igneous rock in the bushing box, actuating the plurality of electrode terminals with current frequencies between about 50 Hz and about 5000 Hz, the molten igneous rock extruding through a plurality of pores in a tip plate defining a bottom surface of the bushing box, and wherein the tip plate extends through a front wall and a rear wall of the bushing box, wherein the tip plate is connected to the first end plate proximate to the front wall, and wherein the tip plate is connected to the second end plate proximate to the rear wall.

In yet another embodiment, the present invention is directed to a system for producing igneous rock fibers, including a bushing box configured to receive molten igneous rock from distribution channels of a furnace, a plurality of electrode terminals lining exterior side walls of the bushing box, operable to inductively heat or maintain temperature of the molten igneous rock in the bushing box, a tip plate defining a bottom surface of the bushing box and including a plurality of pores through which the molten igneous rock is extruded, and a motor configured to move the tip plate upwardly or downwardly relative to the bushing box.

These and other aspects of the present invention will become apparent to those skilled in the art after a reading of the following description of the preferred embodiment when considered with the drawings, as they support the claimed invention.

BRIEF DESCRIPTION OF THE DRAWINGS

PRIOR ART FIG. 1 illustrates an induction furnace for producing basalt fibers according to one embodiment of the prior art.

PRIOR ART FIG. 2 illustrates a bushing system for a basalt melting furnace according to one embodiment of the prior art.

DETAILED DESCRIPTION

Figure 3A:
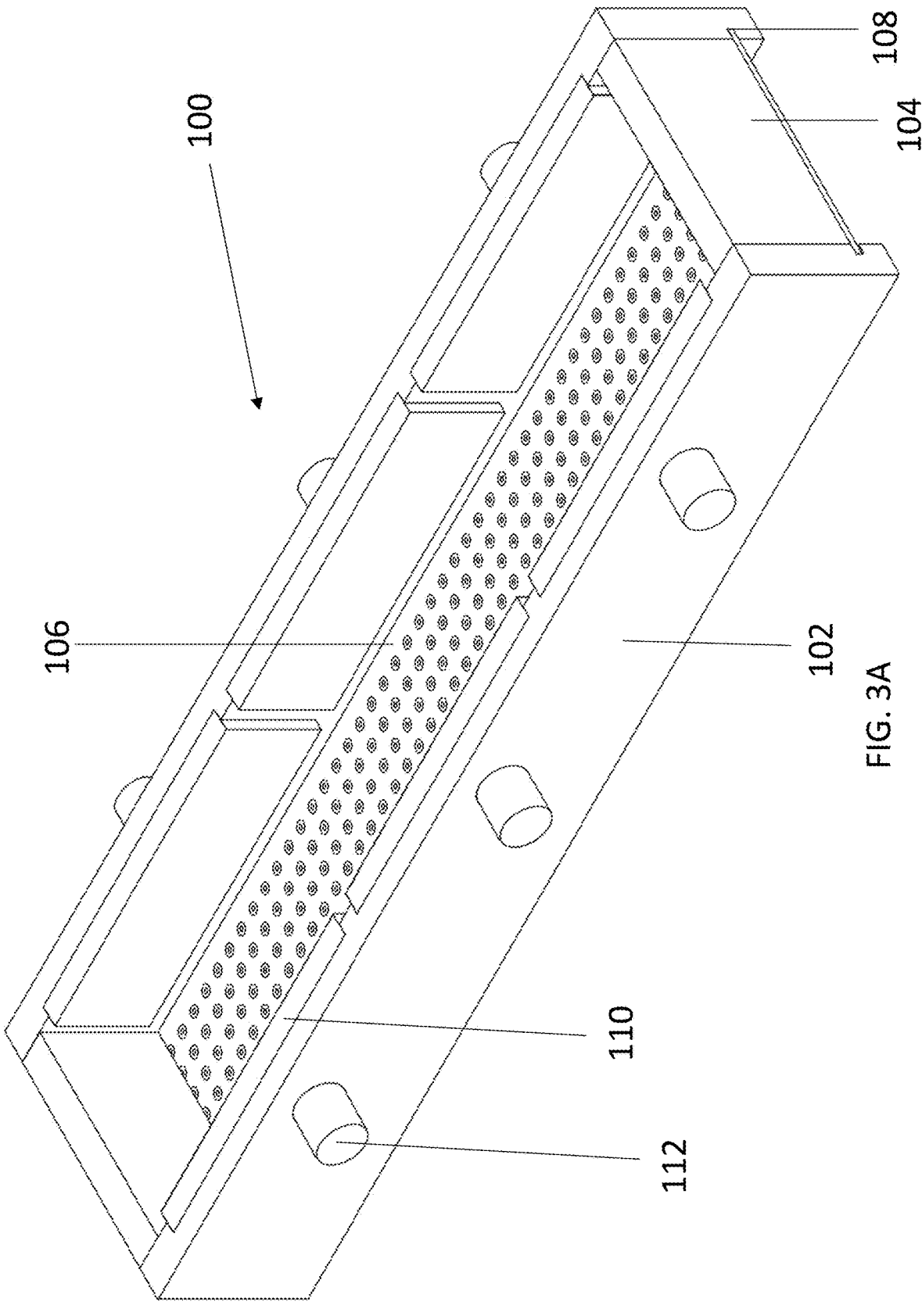
FIG. 3A illustrates a perspective view of a bushing box for manufacturing igneous rock fibers having a plurality of side electrodes according to one embodiment of the present invention.
Figure 3B:
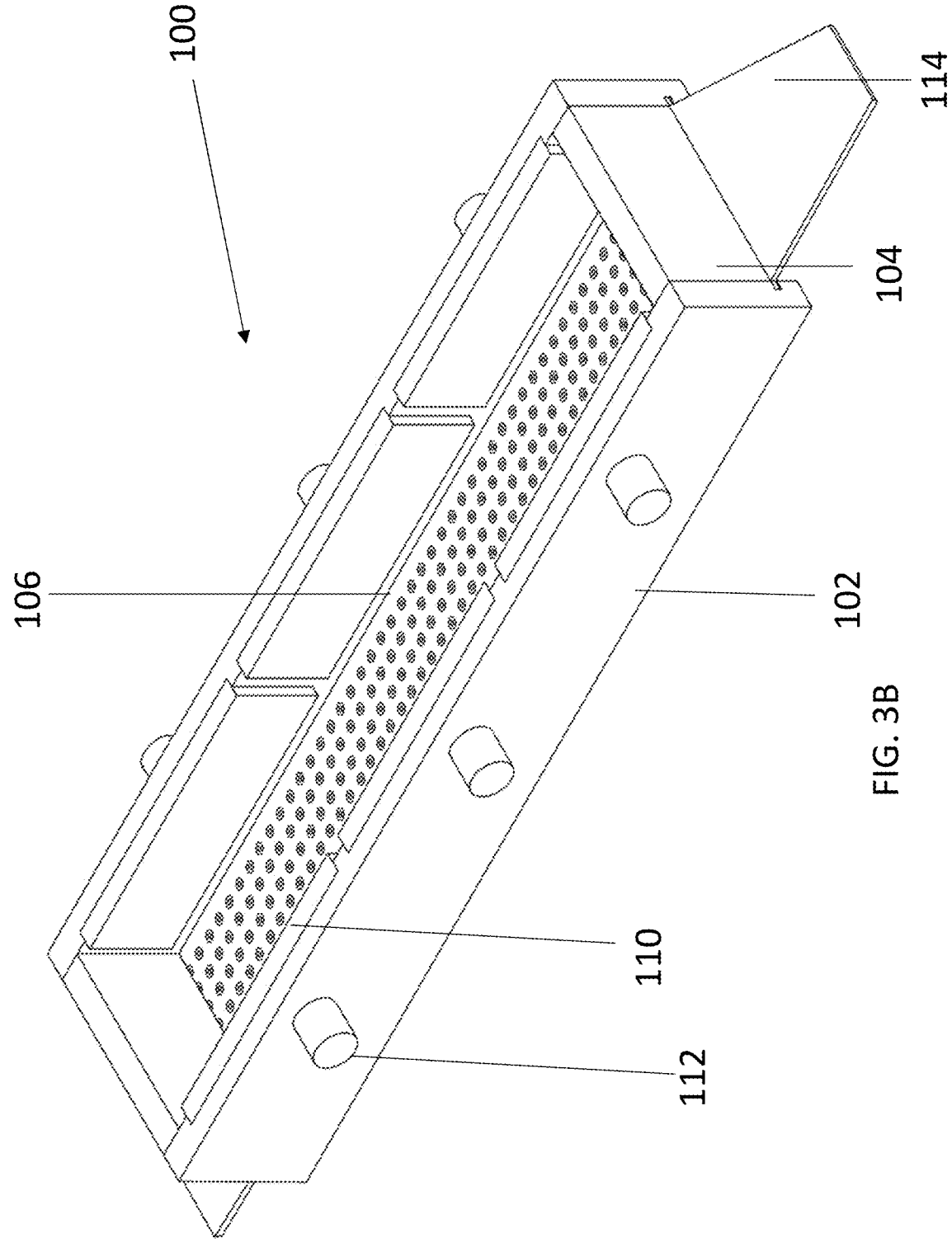
FIG. 3B illustrates a perspective view of a bushing box for manufacturing igneous rock fibers including a plurality of side electrodes and a resistively heated tip plate according to one embodiment of the present invention.
Figure 3C:
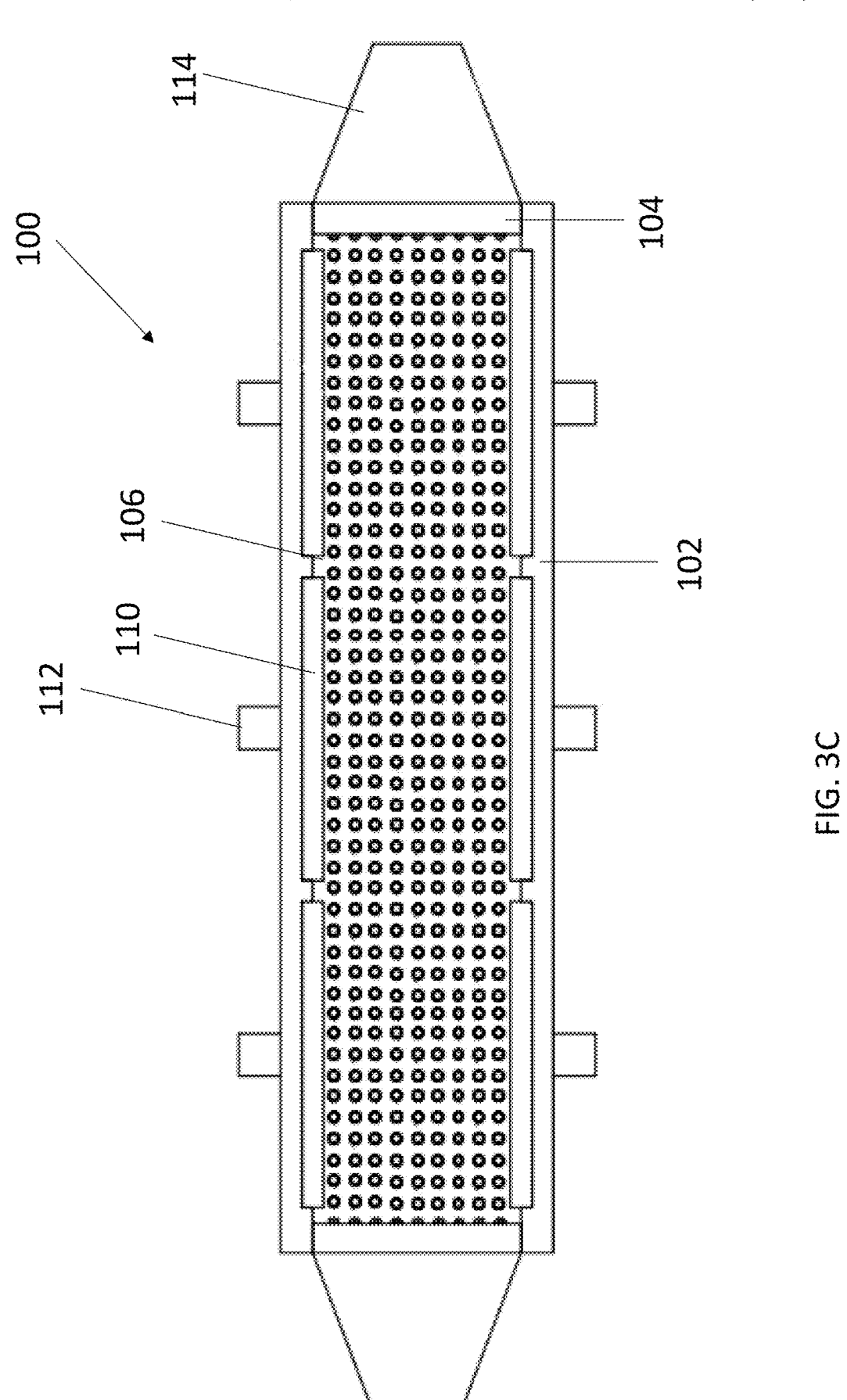
FIG. 3C illustrates a top orthogonal view of the bushing box of FIG. 3B.
Figure 3D:
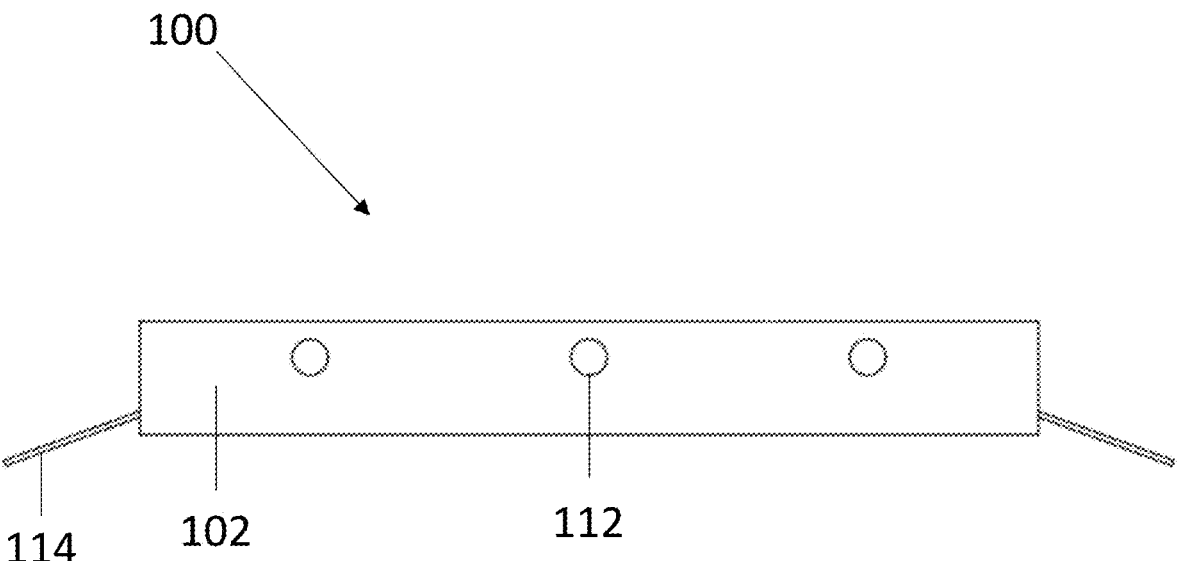
FIG. 3D illustrates a side orthogonal view of the bushing box of FIG. 3B.
Figure 3E:
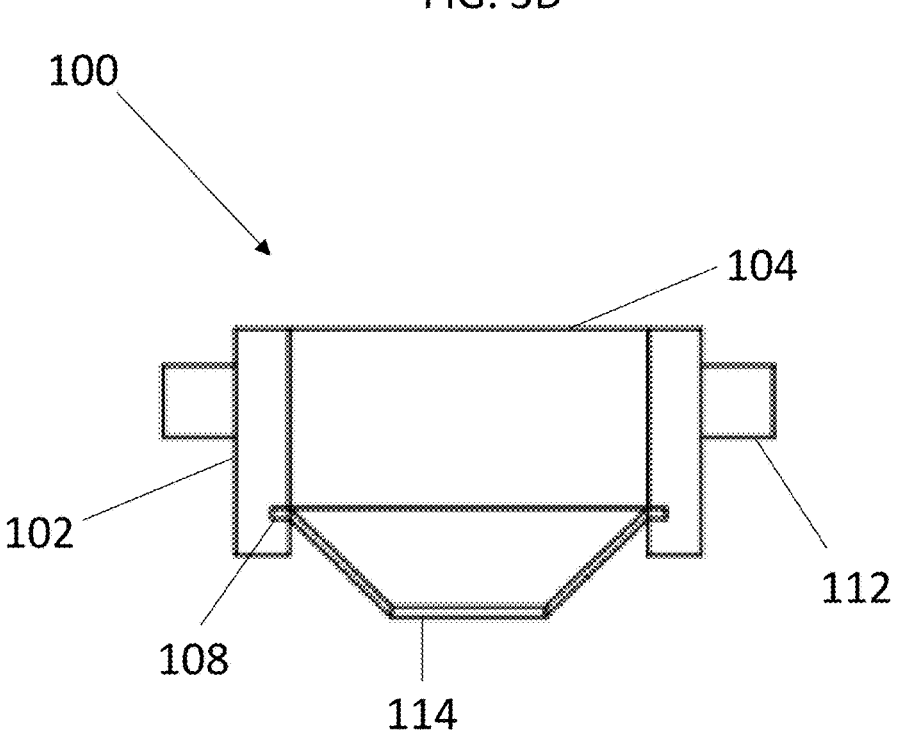
FIG. 3E illustrates a front orthogonal view of the bushing box of FIG. 3B.
Figure 4A:
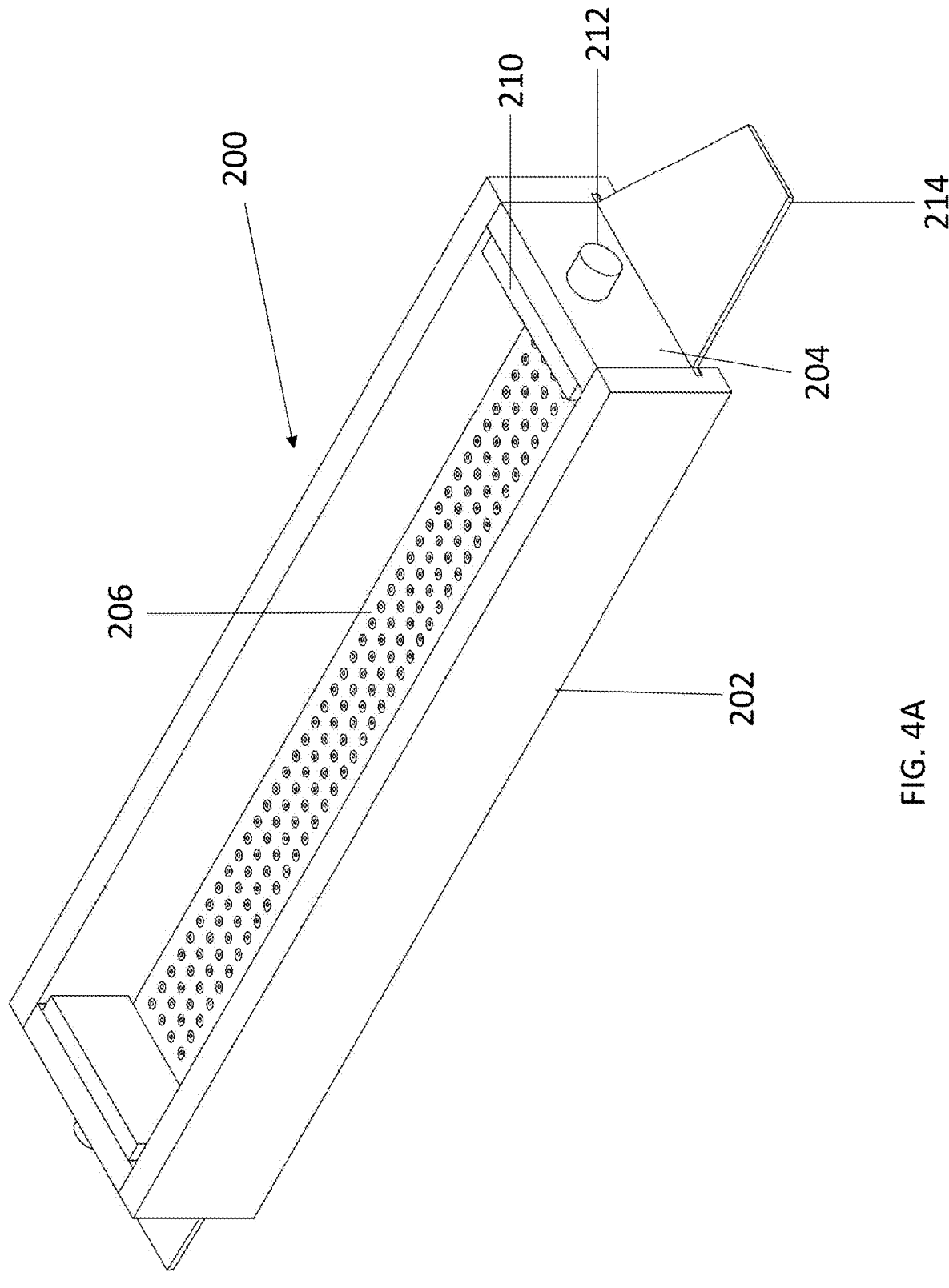
FIG. 4A illustrates a perspective view of a bushing box for manufacturing igneous rock fibers including end electrodes according to one embodiment of the present invention.
Figure 4B:
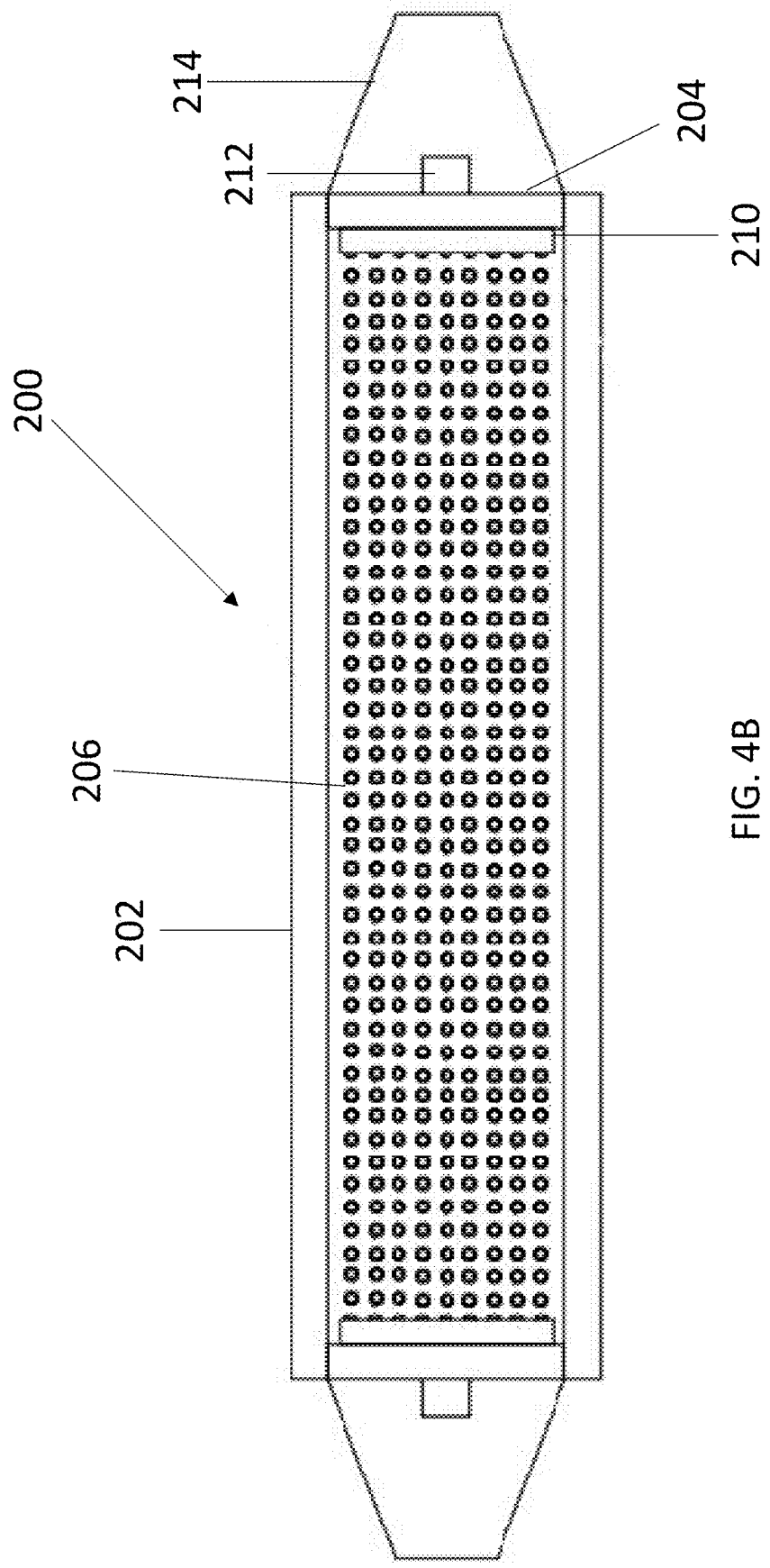
FIG. 4B illustrates a top orthogonal view of the bushing box of FIG. 4A.
Figure 4C:
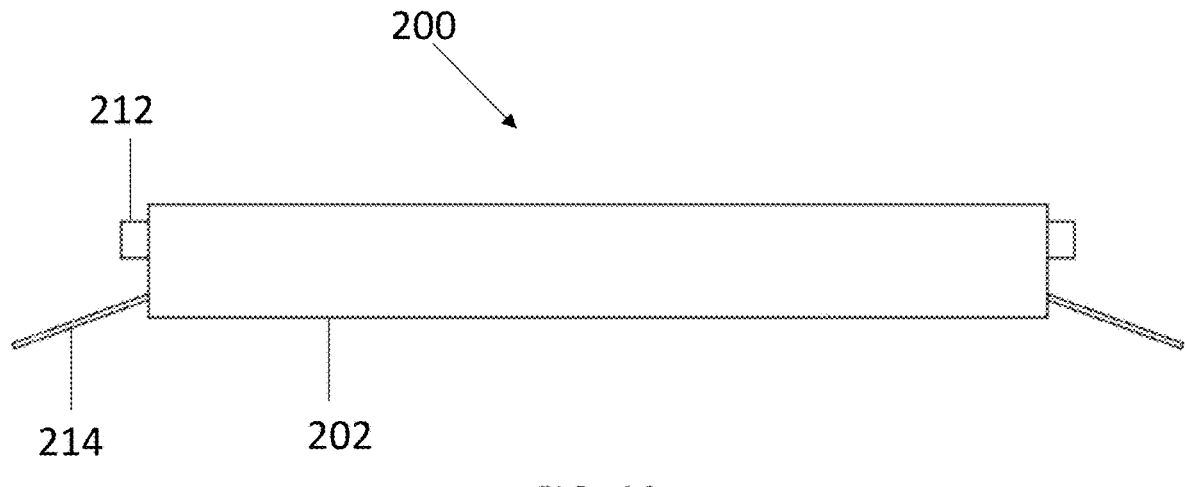
FIG. 4C illustrates a side orthogonal view of the bushing box of FIG. 4A.
Figure 4D:
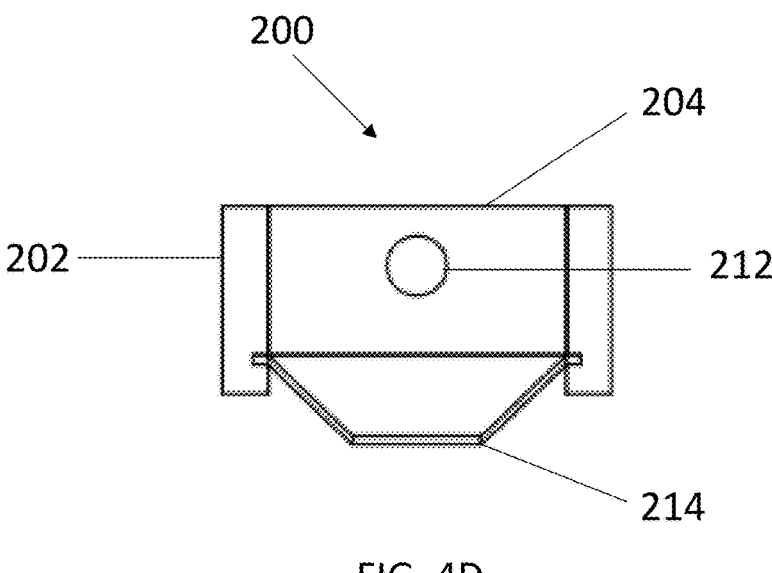
FIG. 4D illustrates a front orthogonal view of the bushing box of FIG. 4A.
Figure 5A:
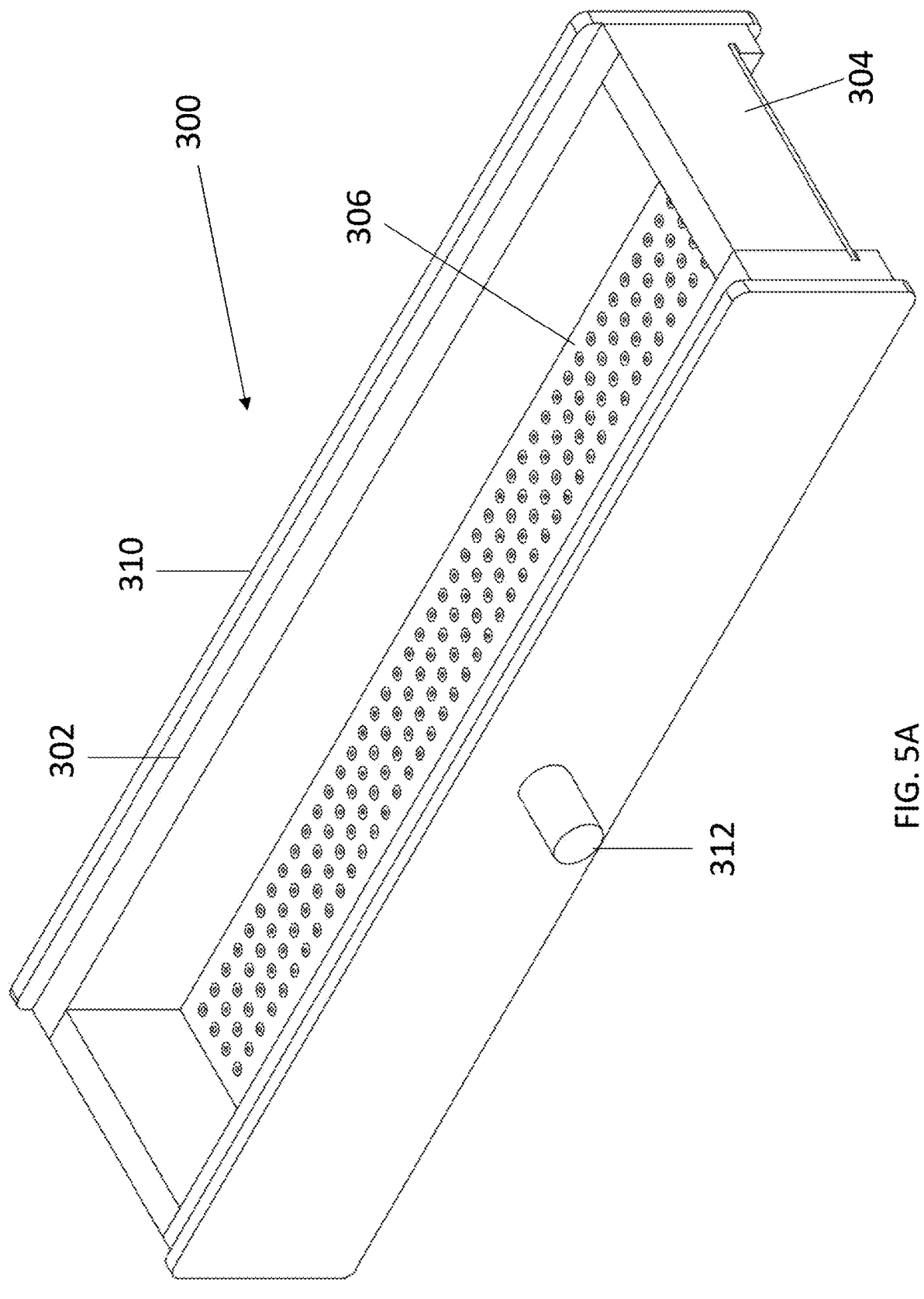
FIG. 5A illustrates a perspective view of a dielectrically heated bushing box for manufacturing igneous rock fibers according to one embodiment of the present invention.
Figure 5B:
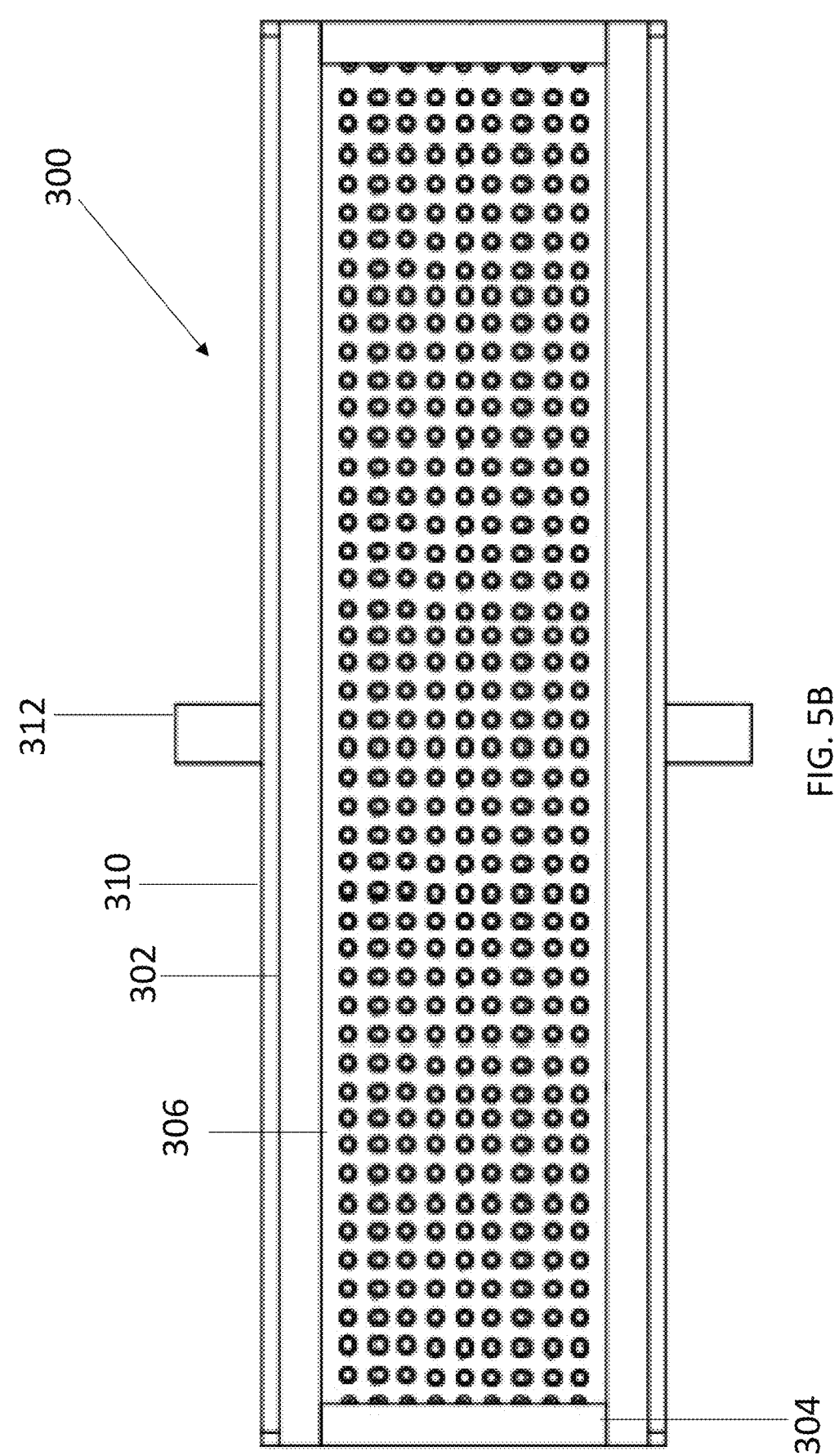
FIG. 5B illustrates a top orthogonal view of the bushing box of FIG. 5A.
Figure 5C:
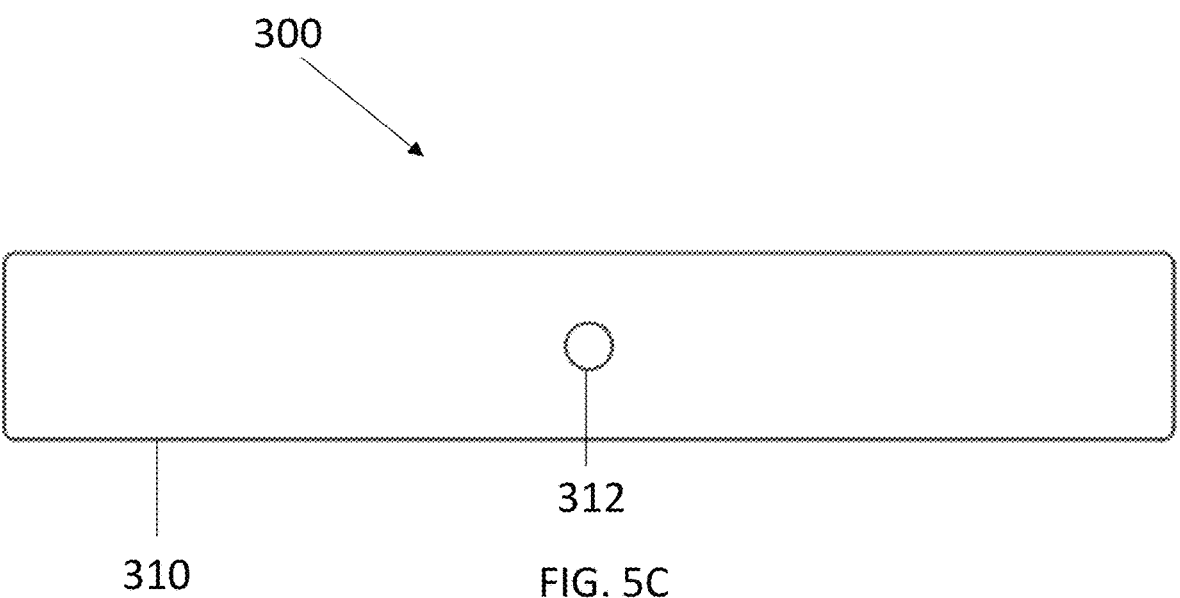
FIG. 5C illustrates a side orthogonal view of the bushing box of FIG. 5A.
Figure 5D:
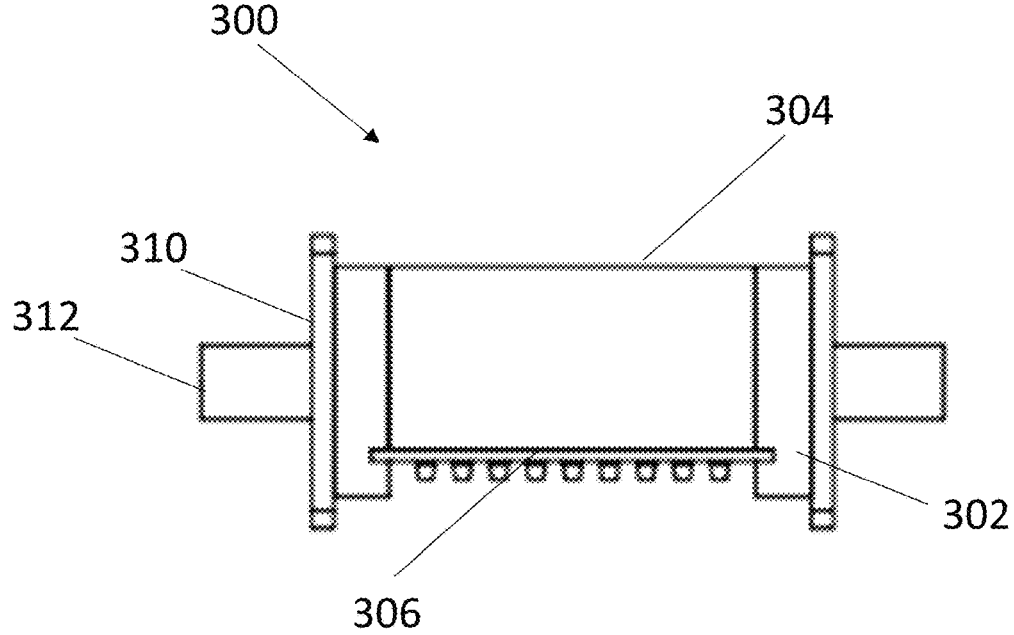
FIG. 5D illustrates a front orthogonal view of the bushing box of FIG. 5A.
Figure 6A:
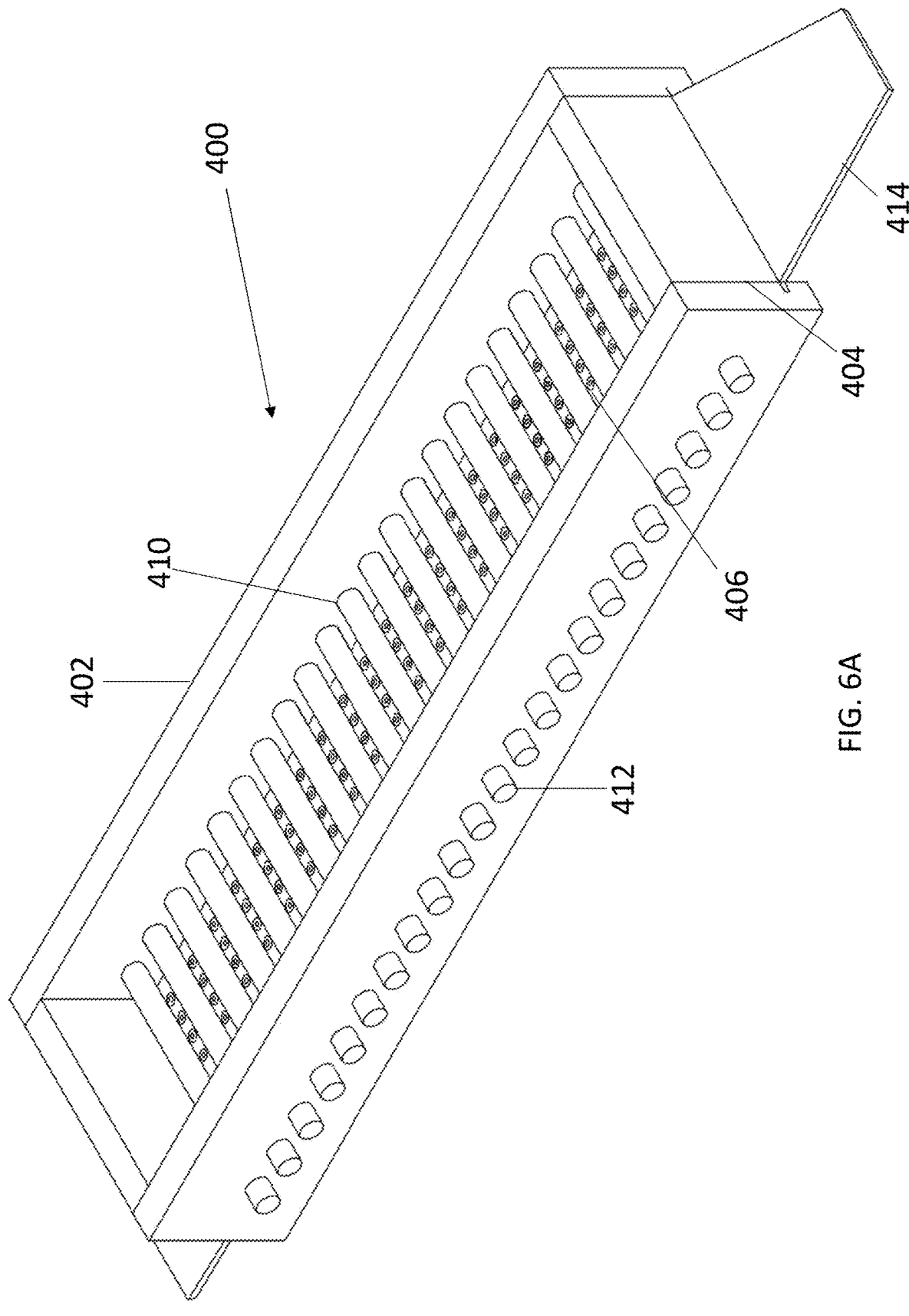
FIG. 6A illustrates a perspective view of a bushing box for manufacturing igneous rock fibers including a plurality of terminals according to one embodiment of the present invention.
Figure 6B:
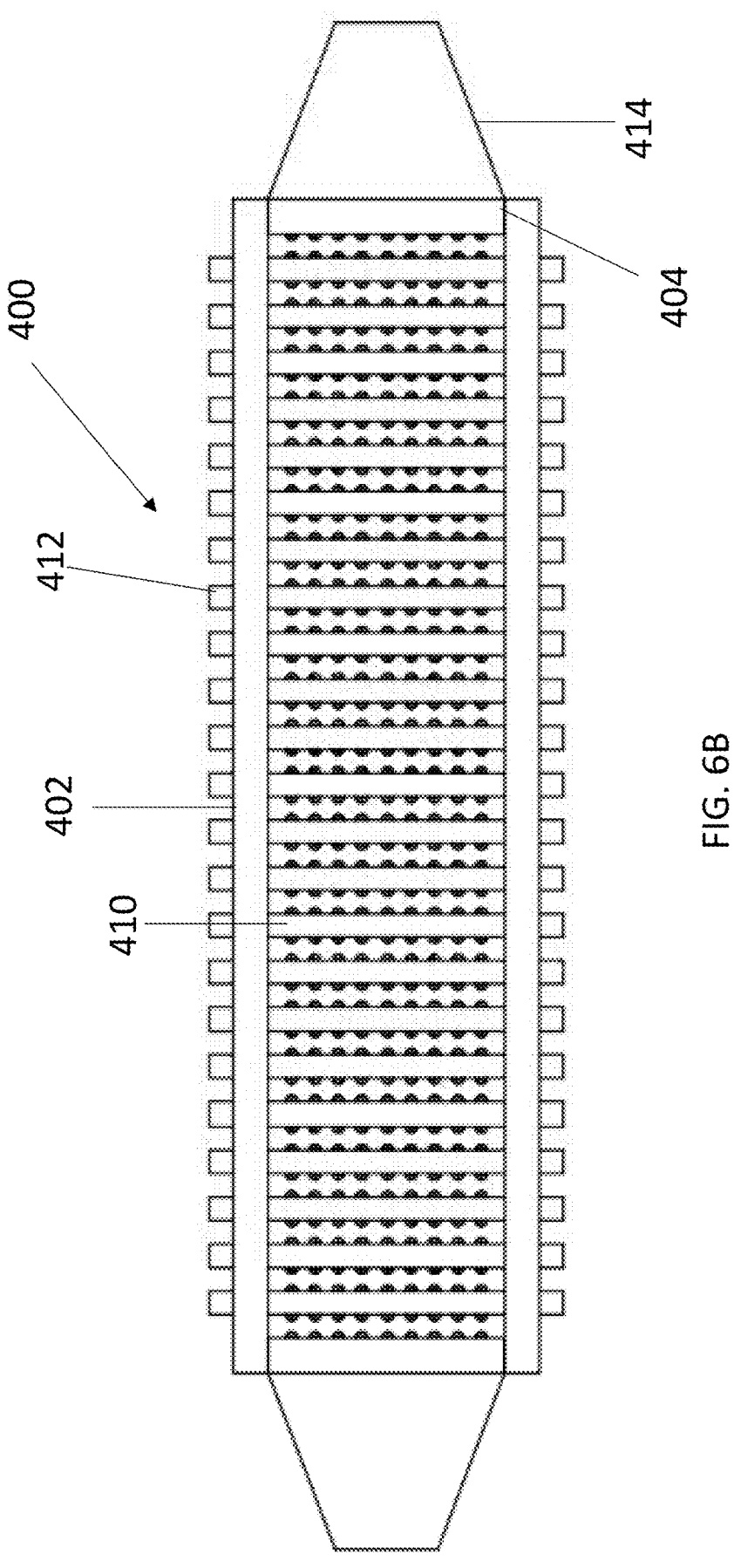
FIG. 6B illustrates a top orthogonal view of the bushing box of FIG. 6A.
Figure 6C:
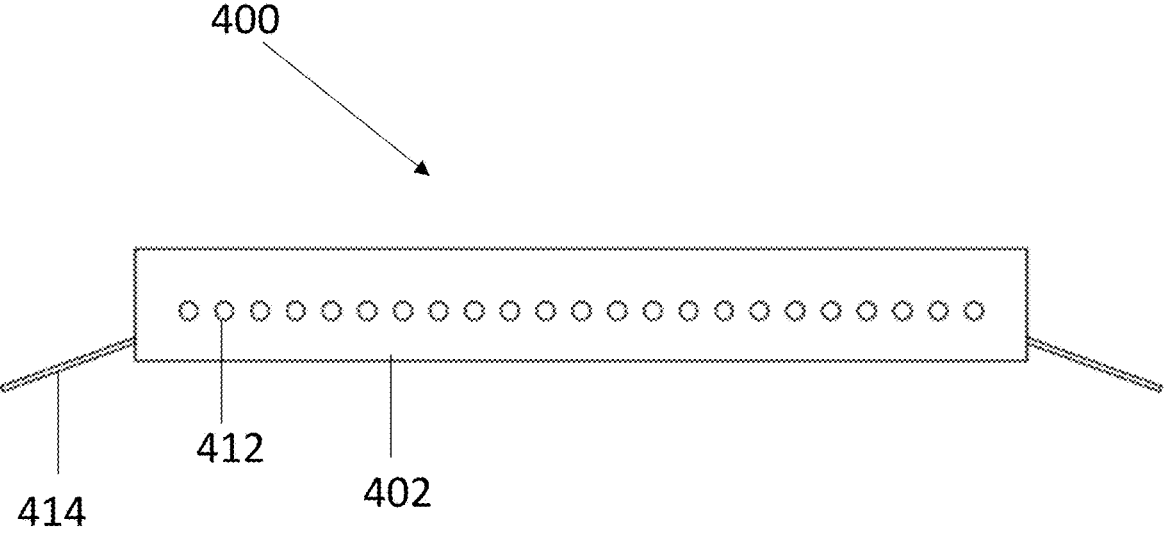
FIG. 6C illustrates a side orthogonal view of the bushing box of FIG. 6A.
Figure 6D:
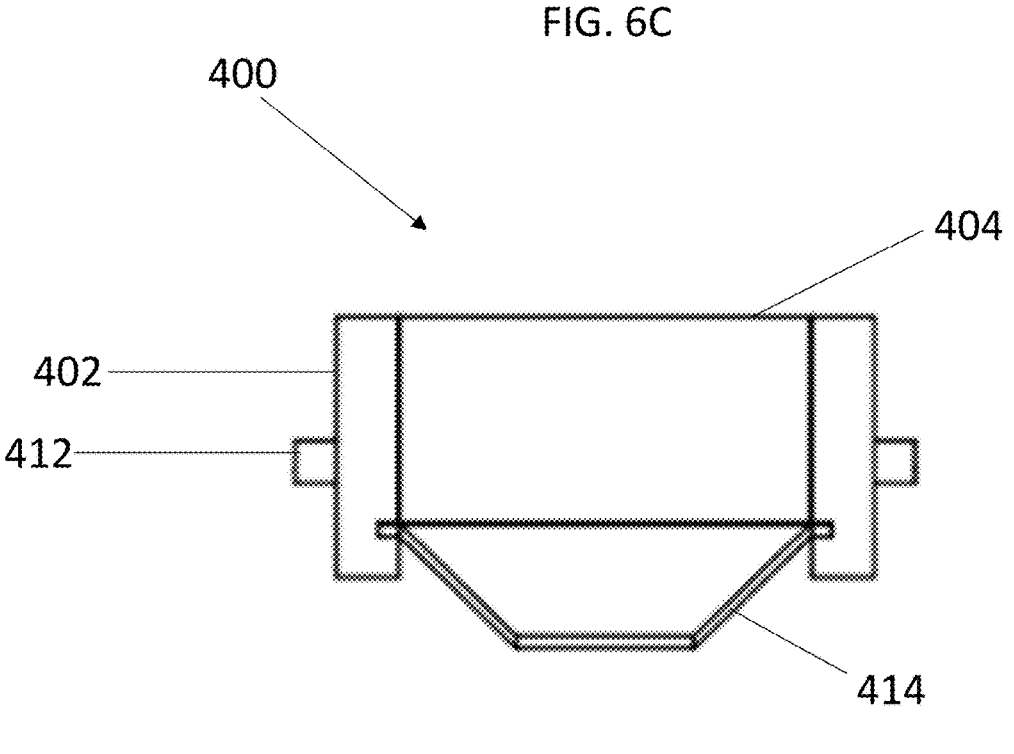
FIG. 6D illustrates a front orthogonal view of the bushing box of FIG. 6A.
Figure 7A:
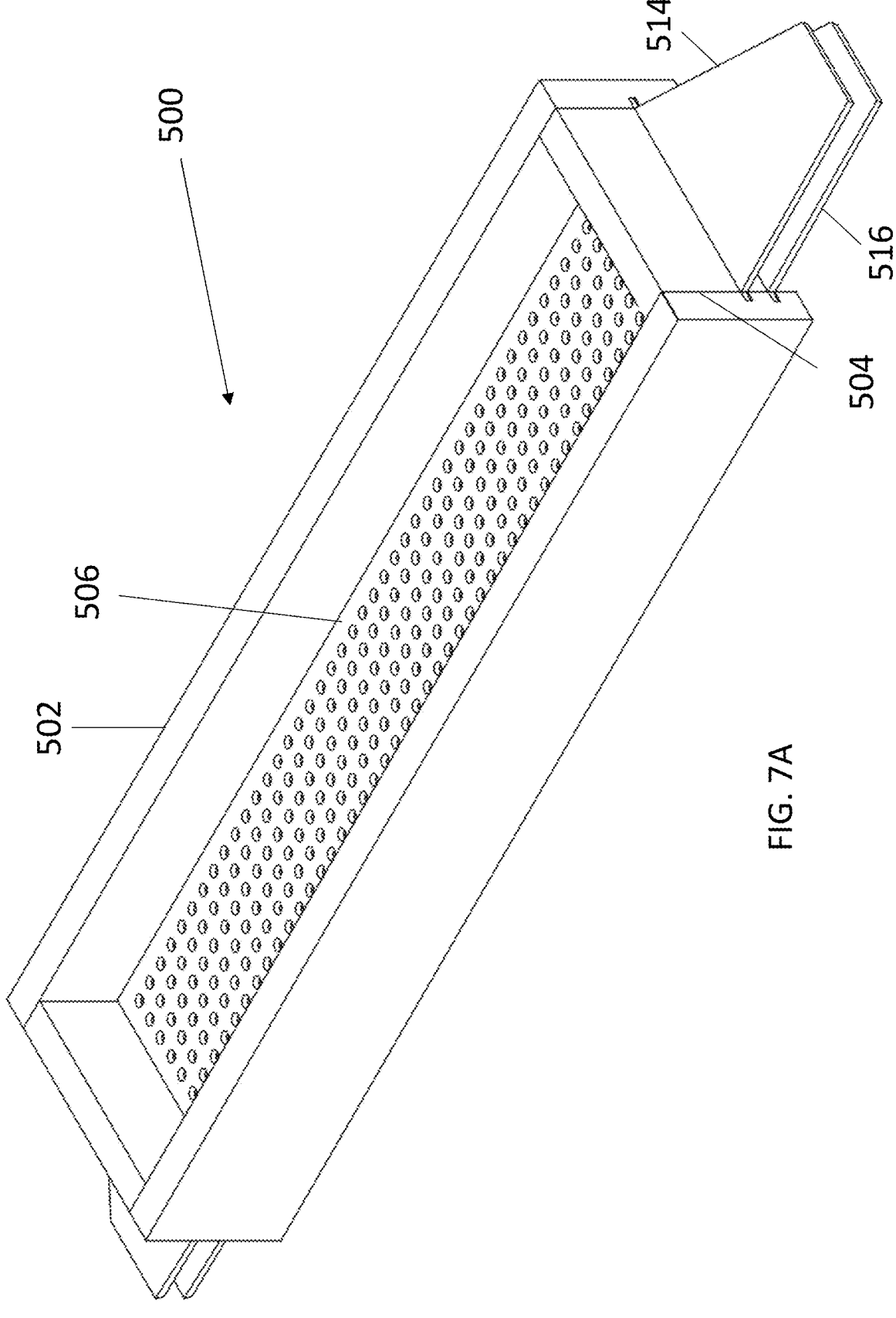
FIG. 7A illustrates a perspective view of a bushing box for manufacturing igneous rock fibers including a top induction plate according to one embodiment of the present invention.
Figure 7B:
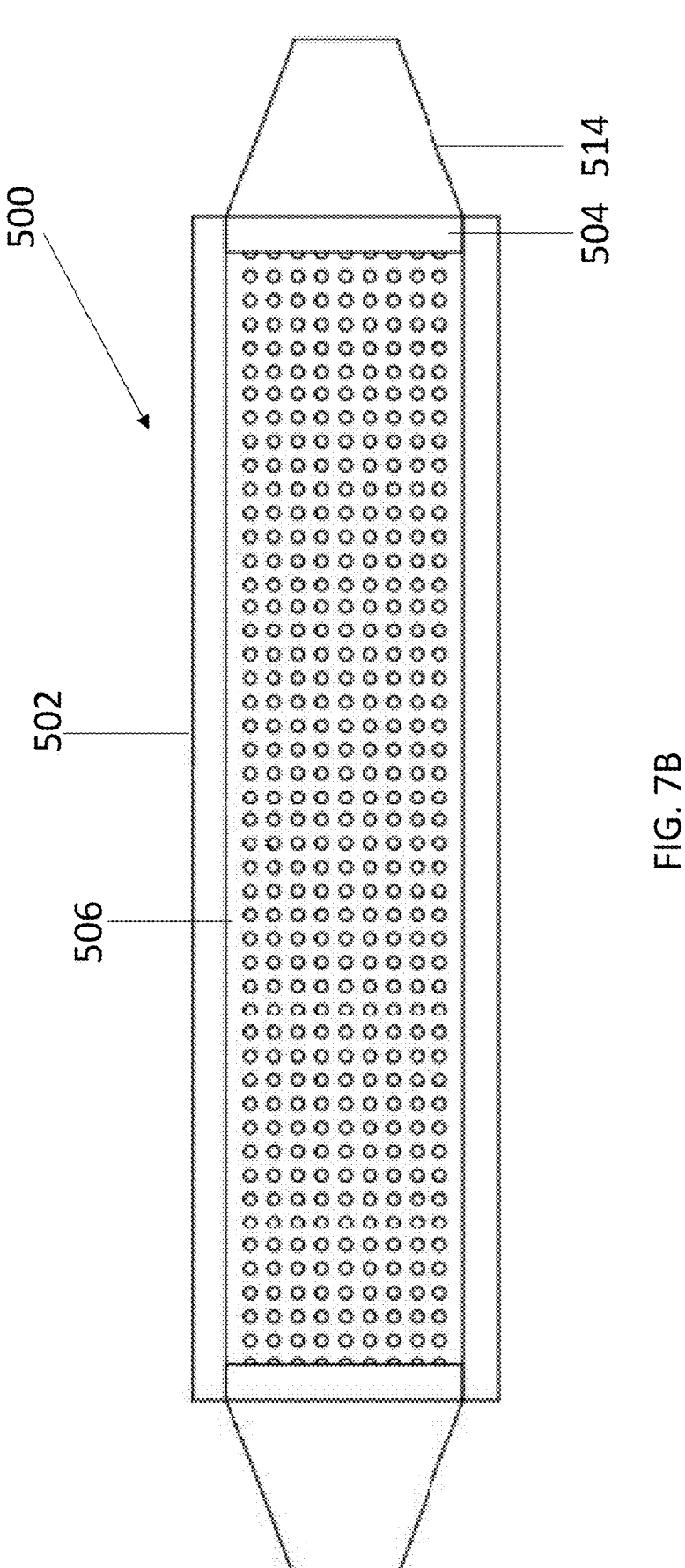
FIG. 7B illustrates a top orthogonal view of the bushing box of FIG. 7A.
Figure 7C:
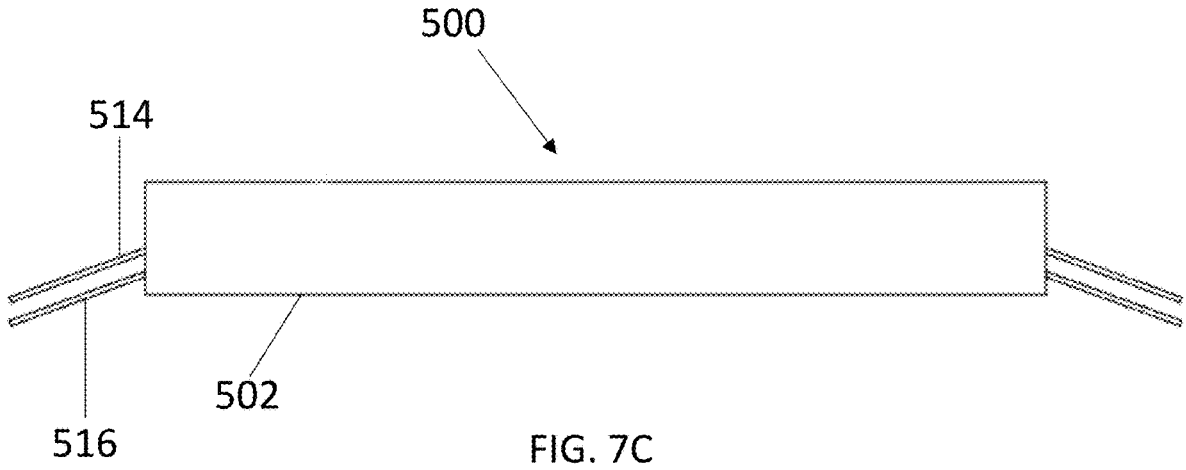
FIG. 7C illustrates a side orthogonal view of the bushing box of FIG. 7A.
Figure 7D:
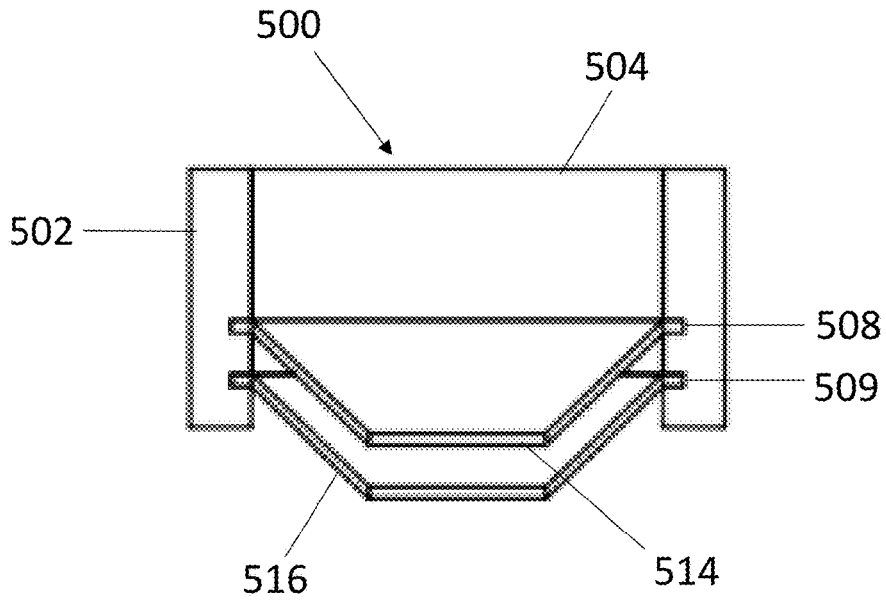
FIG. 7D illustrates a front orthogonal view of the bushing box of FIG. 7A.

The present invention is generally directed to bushing plates for the manufacture of igneous rock fibers, and more specifically to direct, inductive, and other, heating mechanisms for bushing plates for manufacturing igneous rock fibers.

In one embodiment, the present invention is directed to a system for producing igneous rock fibers, including a bushing box configured to receive molten igneous rock from distribution channels of a furnace, a plurality of electrode terminals lining exterior left and right side walls of the bushing box, operable to inductively heat or maintain temperature of the molten igneous rock in the bushing box, and a tip plate defining a bottom surface of the bushing box and including a plurality of pores through which the molten igneous rock is extruded, wherein the tip plate extends through a front wall and a rear wall of the bushing box, wherein the tip plate is connected to a first end plate proximate to the front wall, and wherein the tip plate is connected to a second end plate proximate to the rear wall, and wherein the plurality of electrode terminals are actuated with current frequencies between about 50 Hz and about 5000 Hz.

In another embodiment, the present invention is directed to a method for producing igneous rock fibers, including a bushing box receiving molten igneous rock from distribution channels of a furnace, a plurality of electrode terminals, lining exterior left and right side walls of the bushing box, inductively heating or maintaining temperature of the molten igneous rock in the bushing box, actuating the plurality of electrode terminals with current frequencies between about 50 Hz and about 5000 Hz, the molten igneous rock extruding through a plurality of pores in a tip plate defining a bottom surface of the bushing box, and wherein the tip plate extends through a front wall and a rear wall of the bushing box, wherein the tip plate is connected to the first end plate proximate to the front wall, and wherein the tip plate is connected to the second end plate proximate to the rear wall.

In yet another embodiment, the present invention is directed to a system for producing igneous rock fibers, including a bushing box configured to receive molten igneous rock from distribution channels of a furnace, a plurality of electrode terminals lining exterior side walls of the bushing box, operable to inductively heat or maintain temperature of the molten igneous rock in the bushing box, a tip plate defining a bottom surface of the bushing box and including a plurality of pores through which the molten igneous rock is extruded, and a motor configured to move the tip plate upwardly or downwardly relative to the bushing box.

The industrial production of igneous rock fibers, such as glass fibers, basalt fibers, basaltic andesite fibers, or andesite fibers, typically uses a central furnace designed to heat and melt the constituent components of the fibers. Glass fibers typically require a fairly precise mixture of silica sand, aluminum oxide, limestone, soda ash, and other ingredients, and serious issues often result if the percentages of each ingredient are even slightly off. Furthermore, glass fibers usually require separate suppliers, or at least separate supply lines, for each ingredient, complicating the production process. After heating the ingredients in a furnace to produce molten glass, the glass is conditioned, allowing temperature to drop slightly, before moving through distribution channels of a forehearth and being gravitationally fed through one or more bushing plates having a plurality of pores. The molten glass passes through the plurality of pores to form individual fibers that are then cooled and solidified before being wound onto a spool.

In the case of basalt, basaltic andesite, or andesite fibers, the initial constituent ingredients added to the furnace are far simpler, and typically only include crushed basalt or andesite rocks. However, basalt requires specific adaptations to the glass fiber production process to allow it to properly create basalt fibers. For example, molten basalt cools much faster than molten glass. With existing chambers, this is an issue, as the thickness of the distribution channels is frequently about 10-11 inches (or about 300 mm) (in order to allow heating components to continue heating the molten glass or basalt as it travels through the distribution channels to prevent premature cooling). Because the thickness of the distribution channels is about 10 inches, the molten basalt needs to fall at least about 10 inches before it reaches the bushing plate. While not a significant issue for glass fiber, this poses a unique challenge for basalt due to basalt's tendency to cool faster. This contributes to uneven temperature distribution in the basalt or even an entire unusably low temperature in the basalt melt.

It is important to maintain an even temperature distribution across a bushing plate such that the flow rate is even and that therefore the final diameter of the produced filaments is consistent within narrow limits. Basalt, and other igneous rocks, presents a unique issue for maintaining even temperature distributions. For example, unlike molten glass, molten basalt is opaque, which complicates the methods by which the basalt is able to be heated. For example, radiative transfer is particularly difficult, as the electromagnetic waves used to heat the basalt often do not sufficiently penetrate the molten basalt in order to evenly heat the liquid. On the other hand, another typical heating system, used especially in glass fiber manufacturing, is to resistively heat the bushing plate itself using electrodes attached to either side of the bushing plate. However, due to the porous nature of the bushing plate, the current density through the bushing plate, and therefore the heating of the bushing plate, is not even, which produces undesirable unevenness in the produced fibers. Therefore, an alternative system for maintaining consistent temperature of the molten basalt as it travels through the distribution channels and through the bushing plate is needed.

Retrofitting glass fiber bushing plates for igneous rock forming purposes is particularly problematic due to the presence of iron oxides in the igneous rock. Fiberglass generally only includes about 0.3% iron oxide, but igneous rock, such as basalt, often includes upwards of 15% iron oxide. This iron oxide is responsible for much of the opacity of the basalt mentioned above, but it also increases the wettability of platinum-rhodium bushiness used in glass fiber manufacturing, requiring the distance between pores in the bushing to be nearly twice as large for basalt bushing plates as for glass fiber bushing plates. Furthermore, iron oxides steepens the temperature dependence of the viscosity of basalt fibers greatly, which means that greater precision tends to be required in forming the basalt fibers relative to glass fibers. Therefore, furnaces including bushing boxes and bushing tip plates distinct from those used in the glass fiber industry are needed to improve consistency and efficiency of igneous rock fiber production.

Referring now to the drawings in general, the illustrations are for the purpose of describing one or more preferred embodiments of the invention and are not intended to limit the invention thereto.

One previous invention, described in U.S. Pat. No. 10,696,576, which is incorporated herein by reference in its entirety, has focused on the use of inductive heating of basalt in the furnace. However, the '576 patent limits the use of inductive heating of the basalt to the furnace itself, not accounting for any variation in heat after the basalt exits the furnace or while the basalt is extruded through the pores of the bushing plate. In one embodiment, the furnace of the present invention is inductively heated. However, in another embodiment, the furnace of the present invention includes a plurality of burners extending through sidewalls of the furnace, wherein the plurality of burners are configured to heat the furnace. In one embodiment, the furnace is heated to a temperature between about 1500° C. and about 1800° C., allowing basalt to melt. In another embodiment, the furnace is heated to a temperature between about 1500° C. and about 2000° C. One of ordinary skill in the art will understand that the method of heating the basalt in the furnace to a molten state is not intended to be limited according to the present invention.

A bushing plate is a thin, typically metal plate with a plurality of pores through which the molten basalt flows such that individual fibers are able to form. In one embodiment, the system includes one or more bushing plates directly attached to the one or more distribution channels and tightly covering one or more open areas in the one or more distribution channels, such that molten basalt is unable to flow out of the interface between the one or more distribution channels and the bushing plates. In another embodiment, the system includes one or more bushing boxes attached to one or more of the distribution channels and tightly covering one or more open areas in the one or more distribution channels, such that molten basalt is unable to flow out of the interface between the one or more distribution channels and the bushing boxes. Each bushing box includes at least one bushing plate sealingly attached to inner side walls of the bushing box, such that molten basalt is unable to flow through the interface between the inner side walls of the bushing box and the bushing plate.

Typically, the surfaces of the bushing plates that interact with the molten basalt, and therefore the bushing boxes housing the bushing plates, are substantially rectangular in shape. However, one of ordinary skill in the art will understand that the shape of the top and bottom surfaces of the bushing plates and/or the bushing boxes is not intended to be limited by present invention. In another embodiment, the top and/or bottom surfaces of the bushing plate are substantially circular, triangular, pentagonal, hexagonal, octagonal, trapezoidal, rhomboidal, and/or otherwise shaped. In one embodiment, substantially circular pores extend through the top and/or bottom surfaces of the bushing plate.

In one embodiment, the one or more bushing plates are formed from a platinum-rhodium alloy. Platinum-rhodium alloys are particularly advantageous due to their high temperature strength and resistance to oxidation and corrosion by surrounding air or by molten material. In another embodiment, the one or more bushing plates are formed from iron or a heat-resistance metal ceramic.

In previous inventions, bushing plates are often heated resistively via a current applied through a plurality of electrodes attached to the bushing plate.

One prior art embodiment of an induction furnace used to melt glass or other materials is shown in PRIOR ART FIG. 1. The system 10 includes a first chamber 12 surrounding by one or more induction coils 14 used to inductively heat the first chamber 12 until a charge (e.g., glass fiber material, igneous rock material, etc.) is melted. The first chamber 12 includes a baffle system 16 used to prevent the charge from exiting the first chamber 12 until it is fully melted. Once the charge is sufficiently melted and the first chamber 12 is sufficiently full, the melt passes through an exit 32 of the first chamber 12 into a transport tube 30 into an entrance 34 of a second chamber 20. In one embodiment, the transport tube 30 used in the prior art is heated (inductively, resistively, etc.) by a heating means 36 (e.g., at least one magnet, at least one burner, at least one electrode, etc.). The second chamber 20 is able to act as a sort of conditioning chamber and, in one embodiment, is surrounded by one or more induction coils 22 configured to maintain the melt in the second chamber 20 at or above a predetermined temperature. The melt is then able to exit through the bottom of the second chamber 24 and enter a forehearth and/or one or more distribution channels where the melt is passed to one or more bushing boxes in order to be turned into individual fibers.

Importantly, prior art systems that have described using induction heating for glass fiber or basal formation, such as PRIOR ART FIG. 1, do not include induction coils around the bushing boxes themselves, but rather focus on using induction heating for heating the melting chamber to melt the charge (and not to maintain even heat distribution during fiber formation). Furthermore, it will be understood that the present invention is able to be used with an inductive melting system as shown in PRIOR ART FIG. 1, with other inductive heating furnace configurations, and/or with non-inductive heating systems. One of ordinary skill in the art will understand that the present invention concerns a system for maintaining temperature and consistency of the molten charge material during the fiber forming process, and is agnostic to the method used for the initial charge melting.

PRIOR ART FIG. 2 illustrates a bushing system for a basalt melting furnace according to one embodiment of the prior art. Prior art systems include distribution channels 50 (extending from a furnace, forehearth, or conditioning chamber, not shown in PRIOR ART FIG. 2) distributing melted material to one or more bushing boxes. A feeder pipe 52 is open to the distribution channel 50 and extends downwardly from the distribution channel 50, connecting the distribution channel 50 and a bushing box 56. The feeder pipe 52 is directly resistively heated by one or more sets of electrodes 54. Most commonly, the feeder pipe 52 is formed from a conductive, but durable material, such as a platinum-rhodium alloy, in order to be able to heat the melted charge while also withstanding the high heat. The bushing box 56 includes a plurality of pores 58 (or bushing tips) through which the melted charge passes, forming individual fibers 60.

Because the diameter of the feeder pipe 52 is relatively thin (especially compared to the bushing box 56), the resistive heating system of PRIOR ART FIG. 2 is still able to provide some uniformity to the heating of the igneous rock melt. However, this system comes with serious tradeoffs. First, the feeder pipe 52 itself often needs to be formed from a platinum-rhodium alloy or other expensive alloys, as commonly used in the bushing plates for fiber forming systems. Making the feeder pipe 52 out of this material often increases the cost of the bushings by at least 30% due to the extra, expensive material used. Even more problematic, the small diameter of the feeder pipe 52, which is what allows the system to uniformly heat in the first place, also highly limits the rate at which the system operates and how many fibers are able to be producing simultaneously. As a general rule, the cross sectional area of the feeder pipe 52 cannot be larger than 40% of the total cross-sectional area of all tips 58 in the bushing plate, which is a major rate-limiting step and also correspondingly limits the total area of the tip plate used. Most commonly, these systems only include about 800 tips per bushing plate due to these limitations.

The systems and apparatuses described below improve upon prior systems, including that shown in PRIOR ART FIG. 2, by eliminating the need for a feeder pipe (i.e., the present invention does not use a feeder pipe), overcoming the limitations of direct resistance heating, increasing bushing plate capacity up to at least 4000 tips, and reducing the total cost of the bushing plate system through reduction in weight of platinum-rhodium alloys required for the system.

The present invention describes a system using various sources of heating, such as inductive heating, directing by passing an electric current through the melt, resistive heating and/or dielectric heating (or combinations thereof) to maintain an even temperature distribution of bushing plates from the inside of the melt outward. In one embodiment, the present invention does not include any direct resistance heating of melt material. In another embodiment, the present invention includes both direct resistance heating and other methods of heating the melt. In one embodiment, the present invention only utilizes inductive heating or dielectric heating. In one embodiment, the present invention only includes a platinum-rhodium alloy for the bushing plate (also called the tip plate) itself, and not for the walls of the bushing box, nor for any portion of the distribution channels.

FIGS. 3A-3E illustrate a bushing box for manufacturing igneous rock fibers having a plurality of side electrodes according to one embodiment of the present invention. In one embodiment, the bushing box is formed from an electrically non-conductive and high temperature resistant material. At least one bushing box 100 is attached to one or more distribution channels connected to the melting furnace. The bushing box 100 includes two side walls 102 and two end walls 104. In one embodiment, the two side walls 102 are substantially parallel. In one embodiment, the two end walls 104 are substantially parallel and substantially orthogonal to the two side walls 102. In one embodiment, each end wall 104 is connected to one end of each of the two side walls 102, such that the side walls 102 and the end walls 104 form a hollow rectangular prism. In one embodiment, the side walls 102 and the end walls 104 are connected via adhesive, welding, at least one screw, at least one bolt, at least one latch, or any other suitable attachment means.

A tip plate (or a bushing plate) 106 extends between the side walls 102 and the end walls 104 of the bushing box 100. In one embodiment, the tip plate 106 is substantially orthogonal to both the side walls 102 and the end walls 104 of the bushing box 100. The tip plate 106 includes a plurality of openings (or pores) extends through the thickness of the tip plate 106. The openings allow the molten igneous rock material (e.g., molten basalt, molten andesite) to separate extrude through each opening, forming a plurality of fibers. For prior art inventions, the number of openings in the tip plate tends to be limited to approximately 800, due to prior art heating methods preventing a sufficiently even temperature distribution for larger plates. However, in one embodiment, the tip plate 106 of the present invention includes at least 1000, at least 2000, at least 4000, or at least 8000 openings. In one embodiment, each of the side walls 102 includes at least one linear notch 108 extending inwardly into each side wall 102 along the complete length of the side wall 102. The tip plate 106 is configured to fit within the at least one linear notch 108 of each side wall 102. In one embodiment, the end walls 104 sit on top of the tip plate 106 at each end of the tip plate 106.

In one embodiment, one or more electrodes 110 are attached to the inner surface of each of the two side walls 102. The one or more electrodes 110 for each side wall 102 are paired with a corresponding electrode 110 on the opposite side wall 102, such that the electrode pairs are directed toward each other. In one embodiment, the one or more electrodes 110 include one or more extensions 112 extending through the adjacent side wall 102. The one or more extensions 112 are able to be electrically connected to a circuit and activated in order to activate the one or more electrodes 110. Activation of the one or more electrodes 112 induces direct heating of the material within the bushing box 100 by transmitting an electric current through the melt to bridge between the opposing electrodes 112, such that sufficiently even temperatures are maintained to allow the molten material to extrude into a multitude of individual fibers through the openings of the tip plate 106. In one embodiment adjacent electrodes 110 are in counterphase with respect to each other, in order to reduce or prevent interference between the electrodes 110.

In one embodiment, the tip plate 106 is electrically coupled with end plates 114 capable of being connected in circuit, to allow for resistive heating of the tip plate 106 in addition to the direct heating via transmitting the electric through the electrodes 112 via the melt. While resistive heating alone is often insufficient to uniformly heat the tip plate 106, resistive heating is able to supplement methods such as direct heating in order to improve uniformity.

One of ordinary skill in the art will understand that the materials used for the electrodes 110 are not intended to be limiting according to the present invention. By way of example and not limitation, in one embodiment, the electrodes 110 are molybdenum electrodes, copper electrodes, graphitic electrodes, titanium electrodes, silver electrodes, brass electrodes, platinum electrodes, gold electrodes, and/or any other suitable form of electrode. Furthermore, FIGS. 3A-3E, as well as subsequent figures, depict the electrodes 110 as having a substantially rectangular face. However, one of ordinary skill in the art will understand that the electrodes 110 are capable of having faces of any shape, including circular, pentagonal, hexagonal, octagonal, and/or other shapes.

FIGS. 4A-4D illustrate a bushing box for manufacturing igneous rock fibers including end electrodes according to one embodiment of the present invention. In one embodiment, the bushing box is formed from an electrically non-conductive and high temperature resistant material. At least one bushing box 200 is attached to one or more distribution channels connected to the melting furnace. The bushing box 200 includes two side walls 202 and two end walls 204. In one embodiment, the two side walls 202 are substantially parallel. In one embodiment, the two end walls 204 are substantially parallel and substantially orthogonal to the two side walls 202. In one embodiment, each end wall 204 is connected to one end of each of the two side walls 202, such that the side walls 202 and the end walls 204 form a hollow rectangular prism. In one embodiment, the side walls 202 and the end walls 204 are connected via adhesive, welding, at least one screw, at least one bolt, at least one latch, or any other suitable attachment means.

A tip plate (or a bushing plate) 206 extends between the side walls 202 and the end walls 204 of the bushing box 200. In one embodiment, the tip plate 206 is substantially orthogonal to both the side walls 202 and the end walls 204 of the bushing box 200. The tip plate 206 includes a plurality of openings (or pores) extends through the thickness of the tip plate 206. The openings allow the molten igneous rock material (e.g., molten basalt, molten andesite) to separate extrude through each opening, forming a plurality of fibers. For prior art inventions, the number of openings in the tip plate tends to be limited to approximately 800, due to prior art heating methods preventing a sufficiently even temperature distribution for larger plates. However, in one embodiment, the tip plate 206 of the present invention includes at least 1000, at least 2000, at least 4000, or at least 8000 openings. In one embodiment, each opening has an internal diameter between approximately 1.5 and approximately 4 mm. In one embodiment, each of the side walls 202 includes at least one linear notch extending inwardly into each side wall 202 along the complete length of the side wall 202. The tip plate 206 is configured to fit within the at least one linear notch of each side wall 202. In one embodiment, the end walls 204 sit on top of the tip plate 206 at each end of the tip plate 206.

In one embodiment, one or more electrodes 210 are attached to the inner surface of each of the two end walls 204. The one or more electrodes 210 for each end wall 204 are paired with a corresponding electrode 210 on the opposite end wall 204, such that the electrode pairs are directed toward each other. In one embodiment, the one or more electrodes 210 include one or more extensions 212 extending through the adjacent end wall 204. The one or more extensions 212 are able to be electrically connected to a circuit and activated in order to activate the one or more electrodes 210. Activation of the one or more electrodes 212 directly induces heating of the material within the bushing box 200 by transmitting an electric current through the melt, such that sufficiently even temperatures are maintained to allow the molten material to extrude into a multitude of individual fibers through the openings of the tip plate 206. In one embodiment adjacent electrodes 210 are in counterphase with respect to each other, in order to reduce or prevent interference between the electrodes 210.

In one embodiment, the tip plate 206 is electrically coupled with end plates 214 capable of being connected in circuit, to allow for resistive heating of the tip plate 206 in addition to the direct electrode heating. While resistive heating alone is often insufficient to uniformly heat the tip plate 206, resistive heating is able to supplement methods such as direct heating in order to improve uniformity.

One of ordinary skill in the art will understand that the materials used for the electrodes 210 are not intended to be limiting according to the present invention. By way of example and not limitation, in one embodiment, the electrodes 210 are molybdenum electrodes, copper electrodes, titanium electrodes, silver electrodes, brass electrodes, platinum electrodes, gold electrodes, graphite electrodes, and/or any other suitable form of electrode. Furthermore, FIGS. 4A-4D depict the electrodes 210 as having a substantially rectangular face. However, one of ordinary skill in the art will understand that the electrodes 210 are capable of having faces of any shape, including circular, pentagonal, hexagonal, octagonal, and/or other shapes.

FIGS. 5A-5D illustrate a dielectrically heated bushing box for manufacturing igneous rock fibers according to one embodiment of the present invention. In one embodiment, the bushing box is formed from electrically non-conductive and high temperature resistant materials. At least one bushing box 300 is attached to one or more distribution channels connected to the melting furnace. The bushing box 300 includes two side walls 302 and two end walls 304. In one embodiment, the two side walls 302 are substantially parallel. In one embodiment, the two end walls 304 are substantially parallel and substantially orthogonal to the two side walls 302. In one embodiment, each end wall 304 is connected to one end of each of the two side walls 302, such that the side walls 302 and the end walls 304 form a hollow rectangular prism. In one embodiment, the side walls 302 and the end walls 304 are connected via adhesive, welding, at least one screw, at least one bolt, at least one latch, or any other suitable attachment means.

A tip plate (or a bushing plate) 306 extends between the side walls 302 and the end walls 304 of the bushing box 300. In one embodiment, the tip plate 106 is substantially orthogonal to both the side walls 302 and the end walls 304 of the bushing box 300. The tip plate 306 includes a plurality of openings (or pores) extends through the thickness of the tip plate 306. The openings allow the molten igneous rock material (e.g., molten basalt, molten andesite) to separate extrude through each opening, forming a plurality of fibers. For prior art inventions, the number of openings in the tip plate tends to be limited to approximately 800, due to prior art heating methods preventing a sufficiently even temperature distribution for larger plates. However, in one embodiment, the tip plate 306 of the present invention includes at least 1000, at least 2000, at least 4000, or at least 8000 openings. In one embodiment, each of the side walls 302 includes at least one linear notch extending inwardly into each side wall 302 along the complete length of the side wall 302. The tip plate 306 is configured to fit within the at least one linear notch of each side wall 302. In one embodiment, the end walls 304 sit on top of the tip plate 306 at each end of the tip plate 306.

In one embodiment, one or more electrodes 310 are attached to the outer surface of each of the two side walls 302. The one or more electrodes 310 for each side wall 302 are paired with a corresponding electrode 310 on the opposite side wall 302, such that the electrode pairs are directed toward each other. In one embodiment, the one or more electrodes 310 include one or more extensions 312 extending outwardly from the one or more electrodes 310. The one or more extensions 312 are able to be electrically connected to a circuit and activated in order to activate the one or more electrodes 310. Activation of the one or more electrodes 312 dielectrically heats molten material within the bushing box 300, such that sufficiently even temperatures are maintained to allow the molten material to extrude into a multitude of individual fibers through the openings of the tip plate 306.

In one embodiment, the bushing box 300 including dielectric heating differs from induction heating methods, in part, based on the frequencies used to drive the dielectric electrodes 310 as opposed to the induction electrodes. In one embodiment, the dielectric electrodes are driven by alternating current having a frequency of between approximately 100 kHz and approximately 1 GHz, and are therefore radiofrequency electrodes. In one embodiment, the electrodes of other embodiments are driven by alternating currents having frequencies greater One of ordinary skill in the art will understand that the materials used for the electrodes 310 are not intended to be limiting according to the present invention. By way of example and not limitation, in one embodiment, the electrodes 310 are molybdenum electrodes, copper electrodes, titanium electrodes, silver electrodes, brass electrodes, platinum electrodes, gold electrodes, graphite electrodes, and/or any other suitable form of electrode. Furthermore, FIGS. 5A-5D depict the electrodes 310 as having a substantially rectangular face. However, one of ordinary skill in the art will understand that the electrodes 310 are capable of having faces of any shape, including circular, pentagonal, hexagonal, octagonal, and/or other shapes.

FIGS. 6A-6D illustrate a bushing box for manufacturing igneous rock fibers including a plurality of heating elements according to one embodiment of the present invention. In one embodiment, the bushing box 400 is formed from an electrically non-conductive and high temperature resistant material. A bushing box 400 includes two opposing side walls 402 connected by two orthogonally oriented end walls 404 at each end of the two opposing side walls 402. The bushing box 400 is open from a top side and enclosed from the bottom side by a bushing plate including a plurality of pores 406 through which melt is able to be extruded. In one embodiment, a plurality of heating elements 410 span the width of the bushing box 400. The heating elements 410 extend through the side walls 402 of the bushing box 400 and are connected to leads 412, operable to be connected to one or more resistive heating circuits. The one or more resistive heating circuits are operable to run current through each of the conductive heating elements 410 such that each heating element 410 heats and therefore locally heats the melt. In one embodiment, each of the plurality of conductive heating elements 410 is connected to a separate, independent circuit and therefore the current directed to each terminal 410 is able to differ. This is useful, as it allows differ local areas of the melt to be differentially heating, allowing the system to compensate for potential cold spots while not overheating the melt by increasing the current running through all the terminals 410. In one embodiment adjacent electrodes 410 are in counterphase with respect to each other, in order to reduce or prevent interference between the electrodes 410.

In one embodiment, the bushing plate including the plurality of pores 406 is electrically coupled with end plates 414 capable of being connected in circuit, to allow for resistive heating of the bushing plate in addition to the resistive heating of the elements 410.

One of ordinary skill in the art will understand that the materials used for the heating elements 410 are not intended to be limiting according to the present invention. By way of example and not limitation, in one embodiment, the heating elements 410 are formed from alloys of molybdenum, molybdenum disilicide, platinum, and/or any other suitable conductive material. Furthermore, FIGS. 6A-6D depict the terminals 410 as having a substantially cylindrical shape. However, one of ordinary skill in the art will understand that the terminals 410 are capable of having any shape, including cylindrical, rectangularly prismatic, triangularly prismatic, and/or any other shape.

FIGS. 7A-7D illustrate a bushing box for manufacturing igneous rock fibers including two electrically heated bushing plates according to one embodiment of the present invention. A bushing box 500 includes two opposing side walls 502 connected by two orthogonally oriented end walls 504 at each end of the two opposing side walls 502. The bushing box 500 is open from a top side and includes a first bushing plate, including a plurality of pores through which the melt is extruded into fiber, positioned proximate to the bottom of the bushing box 500. Additionally, the bushing box includes a second bushing plate 506 substantially parallel to the first bushing plate and positioned nearer to the top of the bushing box 500. The second bushing plate 506 also includes a plurality of pores through the melt passes through before reaching the first bushing plate.

In one embodiment, the first bushing plate is electrically coupled with a first pair of end plates 516 capable of being connected in circuit, to allow for resistive heating of the first bushing plate. In one embodiment, the second bushing plate 506 is electrically coupled with a second pair of end plates 514 capable of being connected in circuit, allowing for resistive heating of the second bushing plate 506. Alternatively, in another embodiment, the bushing box 500 includes one or more electrodes attached to the side walls 502 or end walls 504 of the bushing box 500. The bushing plates are able to be operated electrically in counterphase with respect to each other, in order to reduce or prevent interference between the plates 506. While including, for example, a platinum filter plate in the bushing box is known in the prior art, heating a second bushing plate so as to better maintain the temperature of the melt is unknown in the prior art.

In one embodiment, the first bushing plate and/or the second bushing plate 506 of the present invention includes at least 1000, at least 2000, at least 4000, or at least 8000 openings. In one embodiment, each of the side walls 502 includes a first linear notch 509 and a second linear notch 508 extending inwardly into each side wall 502 along the complete length of the side wall 502. The second bushing plate 502 is configured to fit within the second linear notch 508 of each side wall 502, while the first bushing plate is configured to fit within the first linear notch 509.

FIGS. 3A-7D all show embodiments of bushing boxes shaped as rectangular prisms, but one of ordinary skill in the art will understand that these embodiments are not limited to rectangularly prismatic bushing boxes. The bushing boxes are able to take on any number of shapes, including a cylindrical shape. In fact, in some embodiments, the cylindrical shape is advantageous, as it provides for more even temperature, and therefore viscosity, uniformity of the melting body.

Figure 8:
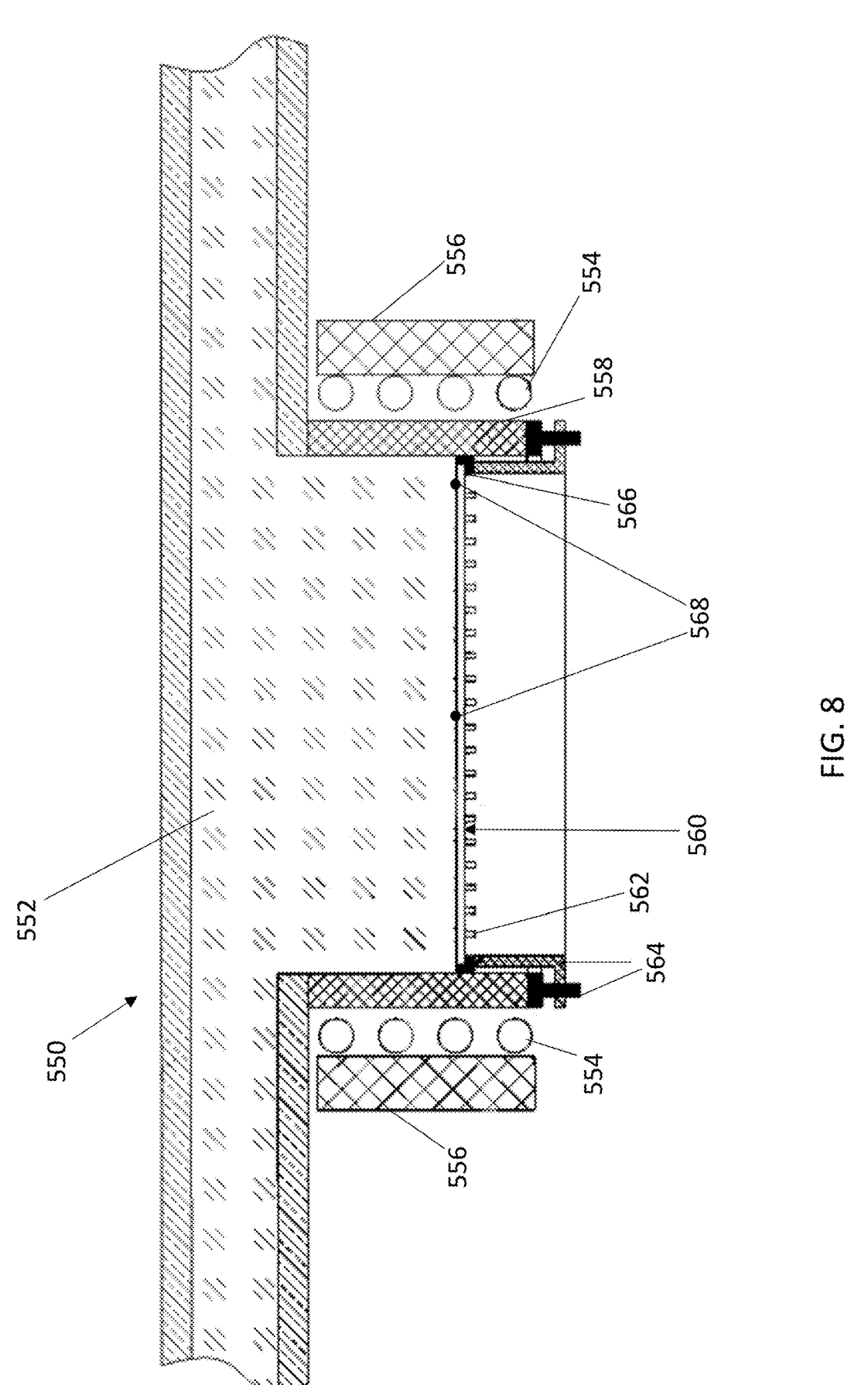
FIG. 8 illustrates a side sectional view of the connection between a distribution channel and a bushing box for manufacturing igneous rock fibers according to one embodiment of the present invention.

FIG. 8 illustrates a side sectional view of the connection between a distribution channel and a bushing box for manufacturing igneous rock fibers according to one embodiment of the present invention. A distribution channel 550 carries molten igneous rock charge 552 from a furnace to the bushing box. The top of the bushing box is open to the distribution channel 550, allowing the molten charge 552 to flow freely into the bushing box. The bushing box includes side walls 558. In one embodiment, the side walls 558 are cylindrical in shape, rectangular prismatic in shape, or otherwise shaped. In one embodiment, the side walls 558 include an internal water-cooling system in order to prevent the side walls 558 from melting from prolonged exposure to the heat of the molten charge 552. The use of a water-cooling system is useful, as it allows the side walls 558 to be formed from a wider range of materials (i.e., materials that do not necessarily need to be overengineered to withstand the heat by themselves), allowing for lower cost alternatives to materials traditionally used in bushing boxes and for materials that do not have risk of interfering with the inductive heating mechanism of the system. For example, in one embodiment, the side walls 558 are formed from a ceramic and/or metal ceramic material. Advantageously, not only are ceramic materials cheaper for use in the side walls, but also have decreased chance to interfere with induction fields generated by the invention. By way of example and not limitation, in one embodiment, the material used for the side walls 558 of the bushing box includes chromium oxide and/or zircon. In another embodiment, the side walls 558 are formed from copper tubes and/or stainless steel tubes, allowing water or other cooling liquid to be run through the tubes to cool the sides and prevent melting of the structure.

In one embodiment, the side walls of the bushing box are surrounded by one or more induction coils 554 configured to inductively heat the molten charge 552 within the bushing box to ensure a more event temperature distribution. In one embodiment, the one or more induction coils 554 are surrounded by one or more magnetic flux concentrators 556, which help focus the magnetic field lines produced by the inductive coils 554 to more efficiently heat the system. One of ordinary skill in the art will understand that the one or more magnetic flux concentrators 556 used in the present invention are able to be formed from any material typical in the industry, notably thin, soft magnetic materials, having high magnetic permeability, low remanence, and low eddy current losses. In another embodiment, the system does not include one or more magnetic flux concentrators.

The bushing box includes a bushing plate 560 including a plurality of pores 562 (or tips) through which the molten charge 552 extrudes to form individual fibers. In a preferred embodiment, the bushing plate 560 has a substantially circular face. In another embodiment, the bushing plate 560 has a substantially rectangular face, but one of ordinary skill in the art will understand that the shape of the bushing plate 560 is able to be adapted to fit the side walls of the bushing box. In one embodiment, one or more temperature sensors 568 are attached to the bushing plate 560 and able to detect the temperature of the bushing plate 560 and/or the temperature of the molten charge 552. In one embodiment, at least one first temperature sensor is attached proximate to the center of the bushing plate 560 and at least one second temperature sensor is positioned at one or more edges of the bushing plate 560, allowing the system to determine the relative heat distribution uniformity of the system. In one embodiment, the bushing plate 560 includes at least 1000, at least 2000, at least 4000, or at least 8000 openings.

In one embodiment, the bushing plate 560 is circumferentially surrounded by a bushing thermal expansion compensator ring 566. In one embodiment, the bushing thermal expansion compensator ring 566 is formed from a compressible material and is therefore able to accommodate and retain the bushing plate 560 within the bushing box, even as the bushing plate 560 expands or contracts with applied heat, increasing the durability and longevity of the system. In another embodiment, the bushing thermal expansion compensator ring 566 is formed from refractory paste.

In one embodiment, the bushing plate (or tip plate) 560 in the bushing box is vertically offset (i.e., raised above) the bottom of the bushing box by a vertical lift system 564. In one embodiment, the vertical lift system 564 includes at least one cross-sectionally L-shaped extension, with a first component attached to and extending downwardly from the exterior circumference of the bushing plate 560 and a second component extending radially outwardly from a bottom end of the first component. The second component attaches to a retainer protrusion extending downwardly from a bottom rim of the bushing box to form the vertical lift system 564. In one embodiment, the system includes at least one motor operable to move the position of the second component of the L-shaped extension within the retainer protrusion of the vertical lift system 564 upwardly or downwardly, such that relative vertical position of the bushing plate 560 is able to be adjusted. The vertical offset of the bushing plate 560 from the bottom of the at least one induction coil 120 is useful in avoiding end effects of the inductive heating mechanism and to therefore better ensure uniformity of the eddy currents induced within the melt (thereby ensuring uniformity of the heating itself). In one embodiment, by removing the second component of the L-shaped extension from the retainer protrusion of the vertical lift system 564, the bushing plate 560 is easily removable from the bushing box, providing for much easier replaceability and repair than existing, prior art systems.

Figure 9:
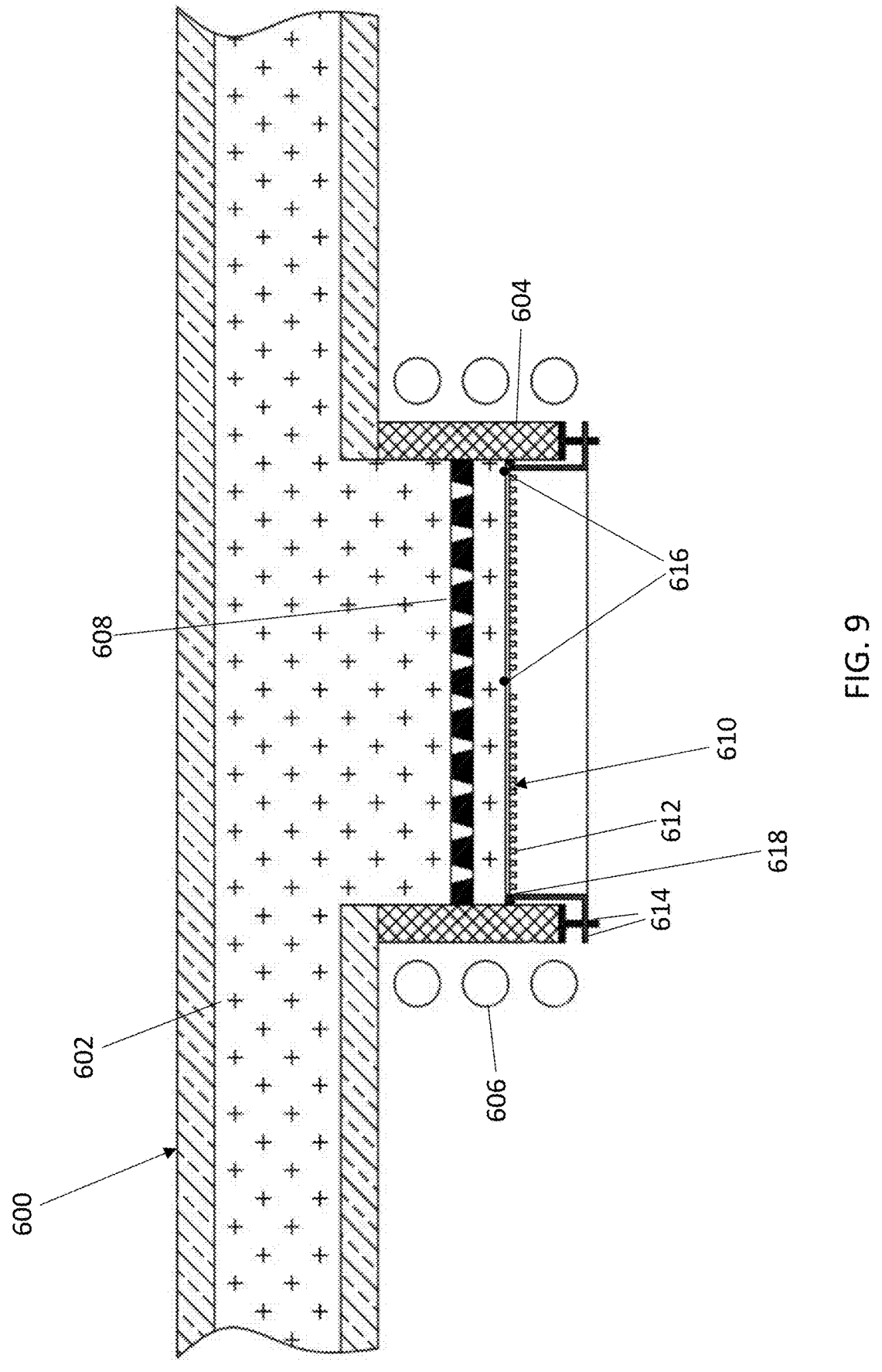
FIG. 9 illustrates a side sectional view of the connection between a distribution channel and a bushing box for manufacturing igneous rock fibers according to one embodiment of the present invention.

FIG. 9 illustrates a side sectional view of the connection between a distribution channel and a bushing box for manufacturing igneous rock fibers according to one embodiment of the present invention. A bushing box is connected to a distribution channel 600 transporting molten igneous rock material 602 (e.g., molten basalt, molten andesite, etc.) from a melting furnace. The top of the bushing box is open to the distribution channel 600, such that molten material 602 from the distribution channel 600 flows into the bushing box. In one embodiment, the bushing box is surrounded by at least one induction coil 606 and/or by at least one pair of electrodes used to maintain heat (and therefore prevent crystallization and reduce fiber breakage) of the molten material 602 entering the bushing box. In one embodiment, the bushing box includes a bushing plate 610 positioned at a first vertical position in the bushing box. The bushing plate includes a plurality of pores 612 through which the melt is extruded to form fibers.

In one embodiment, one or more temperature sensors 616 are attached to the bushing plate 610 and able to detect the temperature of the bushing plate 610 and/or the temperature of the molten charge 602. In one embodiment, at least one first temperature sensor is attached proximate to the center of the bushing plate 610 and at least one second temperature sensor is positioned at one or more edges of the bushing plate 610, allowing the system to determine the relative heat distribution uniformity of the system.

In one embodiment, the bushing plate (or tip plate) 610 in the bushing box is vertically offset (i.e., raised above) the bottom of the bushing box by a vertical lift system 614. In one embodiment, the vertical lift system 614 includes at least one cross-sectionally L-shaped extension, with a first component attached to and extending downwardly from the exterior circumference of the bushing plate 610 and a second component extending radially outwardly from a bottom end of the first component. The second component attaches to a retainer protrusion extending downwardly from a bottom rim of the bushing box to form the vertical lift system 614. In one embodiment, the system includes at least one motor operable to move the position of the second component of the L-shaped extension within the retainer protrusion of the vertical lift system 614 upwardly or downwardly, such that relative vertical position of the bushing plate 610 is able to be adjusted. The vertical offset of the bushing plate 610 from the bottom of the at least one induction coil 606 is useful in avoiding end effects of the inductive heating mechanism and to therefore better ensure uniformity of the eddy currents induced within the melt (thereby ensuring uniformity of the heating itself). In one embodiment, by removing the second component of the L-shaped extension from the retainer protrusion of the vertical lift system 614, the bushing plate 610 is easily removable from the bushing box, providing for much easier replaceability and repair than existing, prior art systems.

In one embodiment, the bushing box also includes a heat flux concentrator 608, also including a plurality of pores through which the melt passes to reach the bushing plate 610. In one embodiment, the plurality of pores of the heat flux concentrator 608 are larger than those of the bushing plate 610. In one embodiment, the heat flux concentrator 608 is formed from at least one electrically conductive material, such as graphite, platinum, molybdenum, a titanium-zirconium-molybdenum (TZM) alloy, and/or another conductive material. However, the at least one electrically conductive material is further selected for its ability to resist the temperatures of the molten volcanic rock material. The electrically conductive material is chosen for its ability to inductively heat through activation of the at least one induction coil 606 and/or the at least one pair of induction electrodes. In one embodiment, the heat flux concentrator 608 is positioned at a second vertical position within the bushing box, where the second vertical position is higher (i.e., closer to the distribution channel 600) than the first vertical position. The heat flux concentrator 608 helps to ensure a more even temperature distribution above the bushing plate 610, which is especially useful as the size of the bushing plate 610 increases.

In one embodiment, the bushing plate 610 is connected to a translation stage driven by at least one motor. Activation of the at least one motor causes the bushing plate 610 to move up or down relative to the heat flux concentrator 608.

Figure 10:
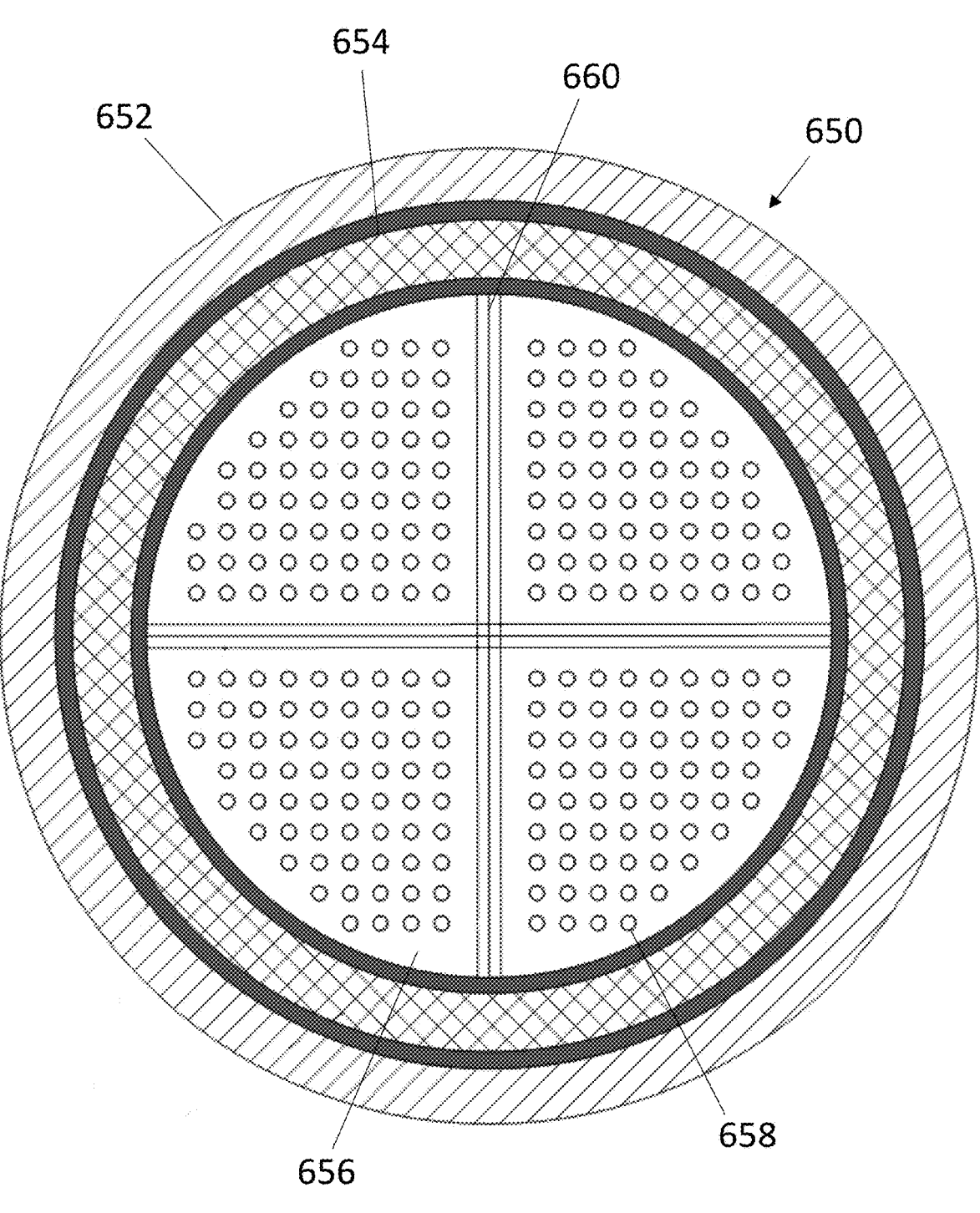
FIG. 10 illustrates a bottom orthogonal view of a bushing plate according to one embodiment of the present invention.

FIG. 10 illustrates a bottom orthogonal view of a bushing plate according to one embodiment of the present invention. The bushing box 650 includes one or more induction coils 652 circumferentially surrounding the side walls 654 of the bushing box 650. A bushing plate 656 within the bushing box 650 includes a plurality of pores (or tips) 658. In one embodiment, the bushing plate 656 includes one or more bushing plate sag prevention features 660, which help to extend the service life of each bushing plate 656 and ensure uniform diameter between filaments. In one embodiment, the sag prevention features 660 include at least one tube running across the bushing plate. In one embodiment, the at least one tube is circulated continuously with water and/or another cooling fluid. In one embodiment, the at least one tube is formed from copper or another metallic material. In another embodiment, the sag prevention features 660 are ribs extending upwardly from the bushing plate 656.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for producing igneous rock fibers, comprising:
   a bushing box configured to receive molten igneous rock;
   one or more induction coils surrounding an exterior surface of the bushing box, operable to inductively heat or maintain temperature of the molten igneous rock in the bushing box; and
   a tip plate defining a bottom surface of the bushing box and including a plurality of pores through which the molten igneous rock is extruded; and a motor configured to move the tip plate upwardly or downwardly relative to the bushing box;
   wherein the one or more induction coils are actuated with current.

2. The system of claim 1, wherein the plurality of pores includes at least 1000 pores.

3. The system of claim 1, wherein the molten igneous rock includes molten basalt.

4. The system of claim 1, wherein side walls of the bushing box are formed from one or more metallic tubes.

5. The system of claim 4, wherein the one or more metallic tubes are formed from copper or stainless steel.

6. The system of claim 4, wherein the side walls of the bushing box are operable to be filled with water or another cooling liquid, providing a water cooling system.

7. The system of claim 1, wherein the tip plate includes one or more sag prevention features.

8. The system of claim 1, further comprising a heat flux concentrator, including a multiplicity of pores, and positioned vertically above the tip plate, wherein the heat flux concentrator is formed from a material able to be inductively heated by the one or more induction coils.

9. A system for producing igneous rock fibers, comprising:
   a bushing box configured to receive molten igneous rock from distribution channels of a furnace;
   one or more induction coils surrounding an exterior surface of the bushing box, operable to inductively heat or maintain temperature of the molten igneous rock in the bushing box;
   a tip plate defining a bottom surface of the bushing box and including a plurality of pores through which the molten igneous rock is extruded; and
   a motor configured to move the tip plate upwardly or downwardly relative to the bushing box.

10. The system of claim 9, wherein the one or more induction coils are actuated with frequencies between about 100 MHz and about 900 MHz.

11. The system of claim 9, further comprising a heat flux concentrator, including a multiplicity of pores, and positioned vertically above the tip plate, wherein the heat flux concentrator is formed from a material able to be inductively heated by the one or more induction coils.

12. The system of claim 9, wherein the tip plate includes one or more sag prevention features.

* * * * *